United States Patent
Lin et al.

(10) Patent No.: US 12,182,968 B2
(45) Date of Patent: Dec. 31, 2024

(54) IMAGE PROCESSING METHOD, APPARATUS, AND DEVICE

(71) Applicant: Huawei Technologies Co., Ltd., Shenzhen (CN)

(72) Inventors: Huan Lin, Hangzhou (CN); Jie Ji, Hangzhou (CN); Jiangzheng Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 17/574,185

(22) Filed: Jan. 12, 2022

(65) Prior Publication Data

US 2022/0138906 A1      May 5, 2022

Related U.S. Application Data

(63) Continuation of application No. PCT/CN2020/098208, filed on Jun. 24, 2020.

(30) Foreign Application Priority Data

Jul. 12, 2019    (CN) .......................... 201910629031.6

(51) Int. Cl.
    *G06T 3/4069*      (2024.01)
    *G06T 3/4046*      (2024.01)
    *G06T 5/50*      (2006.01)

(52) U.S. Cl.
CPC .......... *G06T 3/4069* (2013.01); *G06T 3/4046* (2013.01); *G06T 5/50* (2013.01);
(Continued)

(58) Field of Classification Search
CPC ......... G06T 3/4053; G06T 2207/20084; G06T 3/4046; G06T 5/50; G06T 2207/20021;
(Continued)

(56) References Cited

U.S. PATENT DOCUMENTS 9,547,887 B2    1/2017   Liang et al.
9,906,787 B2 *   2/2018   Amon .................... H04N 19/59
(Continued)

FOREIGN PATENT DOCUMENTS

CN      101079949 A      11/2007
CN      101976435 A      2/2011
(Continued)

OTHER PUBLICATIONS

Bevilacqua, M., et al, "Low-Complexity Single-Image Super-Resolution based on Nonnegative Neighbor Embedding," 2012, 10 pages.
(Continued)

*Primary Examiner* — Ian L Lemieux
(74) *Attorney, Agent, or Firm* — Conley Rose, P.C.

(57) ABSTRACT

An image processing method, where, in the method, a special image filter is generated, and super-resolution is performed on an image based on the image filter. The image filter includes filter parameters corresponding to each pixel in an image that requires super-resolution processing, and pixels with different texture features correspond to different filter parameters. The image super-resolution method, apparatus, device, and the like may be applied to various scenarios such as a video, a game, and photographing.

20 Claims, 15 Drawing Sheets

(52) U.S. Cl.
CPC ............... *G06T 2207/20021* (2013.01); *G06T 2207/20024* (2013.01); *G06T 2207/20084* (2013.01)

(58) Field of Classification Search
CPC ......... G06T 2207/20024; G06T 3/4069; G06T 2207/20081; G06T 3/4038; G06T 2207/20221; G06T 2207/20192; G06T 3/403; G06T 5/00; G06T 5/20; G06T 2207/20028; G06T 3/4076; G06T 5/70; G06T 5/73; G06T 3/4007; G06T 5/77; G06T 7/40; H04N 19/59; H04N 23/698; H04N 1/387; H04N 19/523; G06V 10/462; G06V 10/56; G06V 2201/11; G06V 40/103; G06N 3/045; G06N 3/047; G06N 3/084

See application file for complete search history.

(56) References Cited

U.S. PATENT DOCUMENTS

| | | | |
|---|---|---|---|
| 2005/0152005 | A1 | 7/2005 | Damera-Venkata |
| 2008/0199099 | A1 | 8/2008 | Michel et al. |
| 2009/0022402 | A1* | 1/2009 | Lee ...................... G06T 3/4007 382/195 |
| 2011/0038558 | A1* | 2/2011 | Lee ........................... G06T 1/00 382/284 |
| 2013/0114702 | A1 | 5/2013 | Amon et al. |
| 2017/0193635 | A1 | 7/2017 | Zhao et al. |
| 2018/0075581 | A1 | 3/2018 | Shi et al. |
| 2018/0089803 | A1* | 3/2018 | Zhang ..................... G06N 3/08 |
| 2018/0322614 | A1* | 11/2018 | Petrova ................... G06T 7/246 |
| 2019/0378242 | A1* | 12/2019 | Zhang ..................... G06F 18/22 |
| 2020/0372608 | A1* | 11/2020 | Lee ........................ G06V 10/82 |

FOREIGN PATENT DOCUMENTS

| | | | | | |
|---|---|---|---|---|---|
| CN | 102986220 | A | | 3/2013 | |
| CN | 103475876 | A | | 12/2013 | |
| CN | 106960416 | A | | 7/2017 | |
| CN | 107133601 | A | | 9/2017 | |
| CN | 107197135 | A | | 9/2017 | |
| CN | 107341765 | A | | 11/2017 | |
| CN | 108765343 | A | | 11/2018 | |
| CN | 109919838 | A | | 6/2019 | |
| CN | 107527321 | B | * | 4/2020 | ........... G06T 3/4053 |
| CN | 110264404 | B | * | 12/2020 | |
| CN | 108122262 | B | * | 5/2021 | ............... G06K 9/46 |
| WO | WO-2014044027 | A1 | * | 3/2014 | ........... G06T 3/4007 |

OTHER PUBLICATIONS

Ren, J., et al., "Image super-resolution via adaptive filtering and regularization," 2014, 16 pages.

Jo, Y., et al., "Deep Video Super-Resolution Network Using Dynamic Upsampling Filters Without Explicit Motion Compensation," 2018, 9 pages.

Wang, X., et al., "Recovering Realistic Texture in Image Super-resolution by Deep Spatial Feature Transform," 2018, 10 pages.

Xiaodan, L., et al., "Adaptive Filtering of Forest Vegetation Texture By Remote Sensing Images," 2017, 8 pages.

Yang Wen et al., "Deep Color Guided Coarse-to-Fine Convolutional Network Cascade for Depth Image Super-Resolution," IEEE Transactions on Image Processing, vol. 28, No. 2, Oct. 7, 2018, 13 pages.

* cited by examiner

Raw image

Texture image

Raw image

Gradient image

IMAGE PROCESSING METHOD, APPARATUS, AND DEVICE

CROSS-REFERENCE TO RELATED APPLICATIONS

This is a continuation of International Patent Application No. PCT/CN2020/098208 filed on Jun. 24, 2020, which claims priority to Chinese Patent Application No. 201910629031.6 filed on Jul. 12, 2019. The disclosures of the aforementioned applications are hereby incorporated by reference in their entireties.

TECHNICAL FIELD

This application relates to the field of computer technologies, and in particular, to an image processing method, apparatus, and device.

BACKGROUND

Image super-resolution refers to reconstruction of a low-resolution image to obtain a high-resolution image.

Super-resolution processing may be performed on the low-resolution by using a neural network, to obtain the high-resolution image. For example, a super-resolution convolutional neural network (SRCNN), an enhanced super-resolution generative adversarial network (ESRGAN), or a very deep network for super-resolution (VDSR) may be used to perform super-resolution processing on the low-resolution image, to obtain the high-resolution image. However, the foregoing neural network can perform relatively good super-resolution processing on only some texture-type images. For example, relatively good super-resolution processing can be performed on a building-type image, but relatively good super-resolution processing cannot be performed on a face image by using the foregoing neural network. In other words, image processing of an existing image super-resolution method is less reliable.

SUMMARY

This application provides an image processing method, apparatus, and a device, to improve image processing reliability.

According to a first aspect, an embodiment of this application provides an image processing method. When a super-resolution image of a first image needs to be obtained, an image filter corresponding to the first image may be determined, and super-resolution processing is performed on the first image based on the image filter of the first image, to obtain the super-resolution image of the first image. The image filter includes filter parameters corresponding to each pixel in the first image, and pixels with different texture features correspond to different filter parameters. In other words, the determined image filter includes different filter parameters corresponding to the pixels with different texture features.

In the foregoing process, the determined image filter includes the filter parameters corresponding to each pixel in the first image, and the pixels with different texture features in the first image correspond to different filter parameters. Therefore, when super-resolution processing is performed on the first image by using the image filter, different super-resolution processing may be performed on the pixels with different texture features in the first image, so that super-resolution processing performed on the pixels in the image is related to texture characteristics of the pixels, an effect of performing super-resolution processing on the image is better, and image processing reliability is improved.

In a possible implementation, the image filter corresponding to the first image may be determined in the following feasible implementation: obtaining a texture image of the first image, determining C local texture images and a weight value of each local texture image in the texture image based on texture features of pixels in the texture image, and determining the image filter based on the C local texture images and the weight value of each local texture image. Textures in the local texture images have a same texture feature, a quantity of channels of the image filter is C, $C=f^2 \times t$, f is a preset amplification multiple, t is a quantity of filter parameters corresponding to each pixel in the first image, f is greater than 1, and t is an integer greater than or equal to 1. In another possible implementation, the preset amplification multiple may also be changed to another factor, and may be determined based on a super-resolution requirement.

In a possible implementation, an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image, where i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

In the foregoing process, the texture image of the first image is first obtained, a plurality of local texture images and a weight value of each local texture image in the texture image are determined, and the image filter is determined based on the local texture image and a feature of the local texture image. Textures in the local texture images have a same texture feature, therefore, in the image filter obtained by using the foregoing method, the first image has the filter parameters corresponding to each pixel in the first image, and the pixels with different texture features correspond to different filter parameters. When super-resolution processing is performed on the first image by using the image filter, different super-resolution processing may be performed on different pixels in the first image based on the image filter, thereby improving image processing reliability.

In a possible implementation, the texture image of the first image may be obtained in the following feasible implementation: performing compression processing on the first image based on a preset size, where a size of a compressed first image is the preset size, and determining the texture image based on the compressed first image.

In the foregoing process, after compression processing is performed on the first image, a quantity of pixels included in the compressed first image is relatively small, and a quantity of pixels in the determined texture image is also relatively small. In this way, in a subsequent process of processing the texture image, a data processing amount can be reduced, thereby improving image processing efficiency.

In a possible implementation, the image filter of the first image may be determined in the following feasible implementation: processing the first image by using a recognition model, to obtain the image filter of the first image, where the recognition model is obtained by learning a plurality of groups of samples, each group of samples includes a first sample image and a second sample image, the first sample image and the second sample image have same image content, and resolution of the first sample image is higher than resolution of the second sample image.

The recognition model may be obtained through learning in the following feasible implementation: a plurality of groups of sample images may be input into the recognition model, and the recognition model may learn the plurality of groups of sample images. Because the plurality of groups of sample images include sample images with a plurality of texture characteristics, the recognition model may learn a sample image filter (or a filter parameter) corresponding to a sample low-resolution image in a process in which the sample low-resolution image (the second sample image) with various texture characteristics is super-resolved into a sample high-resolution image (the first sample image). After the recognition model learns the plurality of groups of sample images, the recognition model has a function of determining the image filter of the image. Only when the pixels with different texture features in the image filter correspond to different filter parameters, a high-resolution image obtained through super-resolution by using the image filter is a high-resolution image with a relatively good super-resolution effect. Because a sample high-resolution image in each group of sample images is a high-resolution image with a relatively good super-resolution effect, after the recognition model learns based on the foregoing plurality of groups of sample images, the recognition model has a function of outputting the image filter of the image. In addition, the output image filter has the following characteristics. The image filter includes filter parameters corresponding to each pixel in the image, and pixels with different texture features correspond to different filter parameters.

In the foregoing process, the recognition model is obtained through pre-learning, and the image filter of the first image may be obtained by using the recognition model. The recognition model may learn filter parameters corresponding to images with various texture features from low-resolution images to high-resolution images by training the recognition model. Therefore, in the image filter output by the recognition model, the filter parameters of the image filter corresponding to the pixels with different texture features in the first image are different, so that different super-resolution processing may be performed on different pixels in the first image based on the image filter, thereby improving image processing reliability.

In a possible implementation, the first image may be processed by using the recognition model in the following feasible implementation: performing compression processing on the first image based on a preset size, where a size of a compressed first image is the preset size, and processing the compressed first image by using the recognition model.

In the foregoing process, after compression processing is performed on the first image, the compressed first image includes a relatively small quantity of pixels, so that the recognition model may process a relatively small quantity of pixels, to obtain the image filter of the first image, thereby improving efficiency of the recognition model to determine the image filter of the first image.

In a possible implementation, super-resolution processing may be performed on the first image in the following feasible implementation: obtaining a gradient image of the first image, where a size of the gradient image is the same as that of the first image, a size of the gradient image is M*N, and M and N are both integers greater than 1, processing the gradient image by using the image filter, to obtain a second image, where a size of the second image is (f*M)*(f*N), amplifying the first image by f times to obtain a third image, where a size of the third image is (f*M)*(f*N), and obtaining the super-resolution image based on the second image and the third image, where a size of the super-resolution image is (f*M)*(f*N).

In the foregoing process, the gradient image of the first image is first processed by using the image filter to obtain the second image, and then the super-resolution image is obtained based on the second image and the third image that is obtained by amplifying the first image. A data volume of the gradient image is less than a data volume of the first image. Therefore, the gradient image may be quickly processed by using the image filter, so that the super-resolution image may be quickly determined.

In a possible implementation, processing the gradient image by using the image filter, to obtain a second image includes processing the gradient image by using the image filter, to obtain $f^2$ sub-images, where a size of each sub-image is (f*M)*(f*N), and determining the second image based on the $f^2$ sub-images.

In the foregoing process, different sub-images may represent fine texture characteristics of different regions in the first image. Therefore, the determined second image may represent fine texture features of the first image.

In a possible implementation, processing the gradient image by using the image filter, to obtain $f^2$ sub-images includes processing the gradient image by using parameters in a $(k*t+1)^{th}$ channel to a $(k+1)*t^{th}$ channel in the image filter, to obtain a $k^{th}$ sub-image, where k is sequentially set to 0, 1, . . . , and $f^2-1$.

In the foregoing process, different sub-images are determined based on parameters in different channels in the image filter, and the parameters in different channels in the image filter correspond to texture characteristics of different regions in the first image. Therefore, each sub-image may represent a fine texture feature of different regions in the first image.

In a possible implementation, determining a second image based on the $f^2$ sub-images includes separately performing splicing processing on pixels at a same pixel location in the $f^2$ sub-images, to obtain M*N image blocks, where a size of each image block is f*f, and performing splice processing on the M*N image blocks based on pixel locations of pixels in each image block in the sub-image, to obtain the second image.

In the foregoing process, each sub-image may represent a fine texture feature of different regions in the first image, and the second image is obtained by splicing through the foregoing method. Therefore, the size of the second image may be increased, and the second image may represent the fine texture features of the first image.

According to a second aspect, an embodiment of this application provides an image processing apparatus, including a determining module and a super-resolution module.

The determining module is configured to determine an image filter corresponding to a first image, where the image filter includes filter parameters corresponding to each pixel in the first image, and pixels with different texture features correspond to different filter parameters, and the super-resolution module is configured to perform super-resolution processing on the first image based on the image filter of the first image to obtain a super-resolution image of the first image.

In a possible implementation, the determining module is further configured to obtain a texture image of the first image, determine, in the texture image, C local texture images and a weight value of each local texture image based on texture features of pixels in the texture image, where textures in the local texture images have a same texture feature, $C=f^2 \times t$, f is a preset amplification multiple, t is a quantity of filter parameters corresponding to each pixel in the first image, f is greater than 1, and t is an integer greater than or equal to 1, an determine the image filter based on the C local texture images and the weight value of each local texture image, where a quantity of channels of the image filter is C.

In a possible implementation, an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image. i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

In a possible implementation, the determining module is further configured to perform compression processing on the first image based on a preset size, where a size of a compressed first image is the preset size, and determine the texture image based on the compressed first image.

In a possible implementation, the determining module is further configured to process the first image by using a recognition model, to obtain the image filter of the first image, where the recognition model is obtained by learning a plurality of groups of samples, each group of samples includes a first sample image and a second sample image, the first sample image and the second sample image have same image content, and resolution of the first sample image is higher than resolution of the second sample image.

In a possible implementation, the determining module is further configured to perform compression processing on the first image based on a preset size, where a size of a compressed first image is the preset size, and process the compressed first image by using the recognition model.

In a possible implementation, the super-resolution module is further configured to obtain a gradient image of the first image, where a size of the gradient image is the same as that of the first image, the size of the gradient image is M*N, and M and N are both integers greater than 1, process the gradient image by using the image filter, to obtain a second image, where a size of the second image is (f*M)*(f*N), and f is a preset amplification multiple, amplify the first image by f times to obtain a third image, where a size of the third image is (f*M)*(f*N), and obtain the super-resolution image based on the second image and the third image, where a size of the super-resolution image is (f*M)*(f*N).

In a possible implementation, the super-resolution module is further configured to process the gradient image by using the image filter, to obtain $f^2$ sub-images, where a size of each sub-image is (f*M)*(f*N), and determine the second image based on the $f^2$ sub-images.

In a possible implementation, the super-resolution module is further configured to process the gradient image by using parameters in a $(k*t+1)^{th}$ channel to a $(k+1)*t^{th}$ channel in the image filter, to obtain a $k^{th}$ sub-image, where k is sequentially set to 0, 1, . . . , and $f^2-1$.

In a possible implementation, the super-resolution module is further configured to separately perform splicing processing on pixels at a same pixel position in the $f^2$ sub-images, to obtain M*N image blocks, where a size of each image block is f*f, and perform splice processing on the M*N image blocks based on pixel locations of pixels in each image block in the sub-image, to obtain the second image.

According to a third aspect, an embodiment of this application provides a computer system, including a memory, a processor, and a computer program, where the computer program is stored in the memory, and the processor runs the computer program and performs the following steps of determining an image filter corresponding to a first image, where the image filter includes filter parameters corresponding to each pixel in the first image, and pixels with different texture features correspond to different filter parameters, and performing super-resolution processing on the first image based on the image filter of the first image to obtain a super-resolution image of the first image.

In a possible implementation, the processor is further configured to obtain a texture image of the first image, determine, in the texture image, C local texture images and a weight value of each local texture image based on texture features of pixels in the texture image, where textures in the local texture images have a same texture feature, $C=f^2 \times t$, f is a preset amplification multiple, t is a quantity of filter parameters corresponding to each pixel in the first image, f is greater than 1, and t is an integer greater than or equal to 1, and determine the image filter based on the C local texture images and the weight value of each local texture image, where a quantity of channels of the image filter is C.

In a possible implementation, an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image. i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

In a possible implementation, the processor is further configured to perform compression processing on the first image based on a preset size, where a size of a compressed first image is the preset size, and determine the texture image based on the compressed first image.

In a possible implementation, the processor is further configured to process the first image by using a recognition model, to obtain the image filter of the first image, where the recognition model is obtained by learning a plurality of groups of samples, each group of samples includes a first sample image and a second sample image, the first sample image and the second sample image have same image content, and resolution of the first sample image is higher than resolution of the second sample image.

In a possible implementation, the processor is further configured to perform compression processing on the first image based on a preset size, where a size of a compressed first image is the preset size, and process the compressed first image by using the recognition model.

In a possible implementation, the processor is further configured to obtain a gradient image of the first image, where a size of the gradient image is the same as that of the first image, the size of the gradient image is M*N, and M and N are both integers greater than 1, process the gradient image by using the image filter, to obtain a second image, where a size of the second image is (f*M)*(f*N), and f is a preset amplification multiple, amplify the first image by f times to obtain a third image, where a size of the third image is (f*M)*(f*N), and obtain the super-resolution image based on the second image and the third image, where a size of the super-resolution image is (f*M)*(f*N).

In a possible implementation, the processor is further configured to process the gradient image by using the image filter, to obtain $f^2$ sub-images, where a size of each sub-image is (f*M)*(f*N), and determine the second image based on the $f^2$ sub-images.

In a possible implementation, the processor is further configured to process the gradient image by using parameters in a $(k*t+1)^{th}$ channel to a $(k+1)*t^{th}$ channel in the image filter, to obtain a $k^{th}$ sub-image, where k is sequentially set to 0, 1, . . . , and $f^2-1$.

In a possible implementation, the processor is further configured to separately perform splicing processing on pixels at a same pixel position in the $f^2$ sub-images, to obtain M*N image blocks, where a size of each image block is f*f, and perform splice processing on the M*N image blocks based on pixel locations of pixels in each image block in the sub-image, to obtain the second image.

According to a fourth aspect, an embodiment of this application provides a computer-readable storage medium, where the computer-readable storage medium stores a computer program, and the computer program is used to implement the image processing method according to any implementation of the first aspect.

According to a fifth aspect, an embodiment of this application further provides a chip, including an interface circuit and a processor. The processor is configured to invoke program instructions by using the interface circuit, to implement the image processing method according to any implementation of the first aspect.

According to a sixth aspect, an embodiment of this application further provides a computer program or a computer program product, where the computer program or the computer program product includes computer-readable instructions, and when the computer-readable instructions are read by one or more processors, the image processing method according to any implementation of the first aspect is implemented.

According to an image processing method, an apparatus, and a device provided in this embodiment of this application, when the super-resolution image of the first image needs to be obtained, the image filter corresponding to the first image may be first determined, and then super-resolution processing is performed on the first image by using the image filter, to obtain the super-resolution image of the first image. The image filter includes the filter parameters corresponding to each pixel in the first image, and the pixels with different texture features correspond to different filter parameters. Therefore, when super-resolution processing is performed on the first image by using the image filter, different super-resolution processing may be performed on pixels with different texture features in the first image, so that super-resolution processing performed on the pixels in the image is related to texture characteristics of the pixels, an effect of performing super-resolution processing on the image is better, and image processing reliability is improved.

DESCRIPTION OF EMBODIMENTS

For ease of understanding, concepts in this application are first described.

Figure 1:
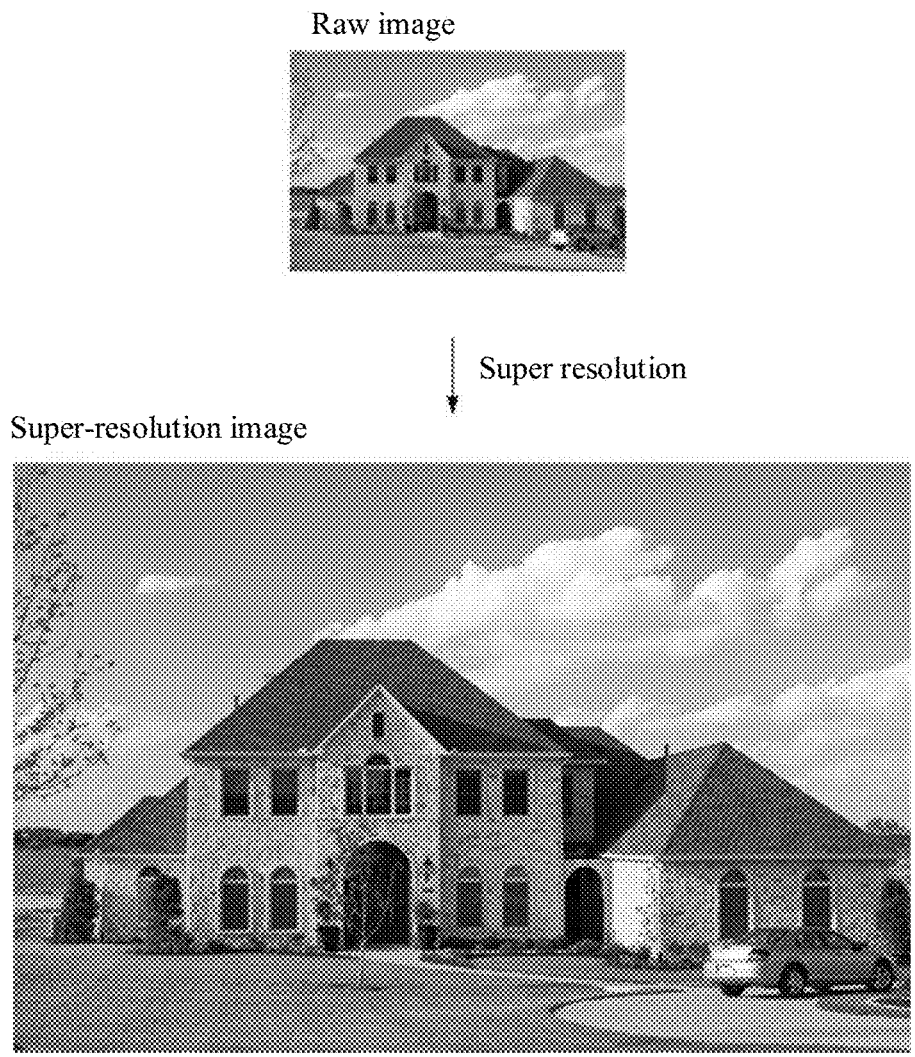
FIG. 1 is a schematic diagram of a super-resolution image according to an embodiment of this application.

Image super-resolution may also be referred to as image super-resolution, and refers to reconstruction of a low-resolution image to obtain a high-resolution image. The following describes the image super-resolution with reference to FIG. 1. FIG. 1 is a schematic diagram of a super-resolution image according to an embodiment of this application. Refer to FIG. 1. A raw image and a super-resolution image are included. Super-resolution processing is performed on the raw image to obtain the super-resolution image, and the raw image and the super-resolution image have same image content. For example, it is assumed that resolution of the raw image is a*b, and an amplification multiple is 3, a resolution of the super-resolution image is 3a*3b. In a resolution a*b of an image, a refers to a quantity of pixels horizontally included in the image, and b refers to a quantity of pixels vertically included in the image. The resolution of the image may also be referred to as a size of the image.

A texture may also be referred to as a pattern, and refers to a pattern or a pattern presented on a surface of an object.

Figure 2:
FIG. 2 is a schematic diagram of a texture image according to an embodiment of this application.
Figure 2:
Figure 2:

A texture image refers to an image that includes a texture in the raw image. The following describes the texture image with reference to FIG. 2. FIG. 2 is a schematic diagram of a texture image according to an embodiment of this application. Refer to FIG. 2. A raw image and the texture image are included, and the texture image includes a texture in the raw image. It should be noted that FIG. 2 merely schematically shows a type of texture image in the raw image. For example, the type of the texture image may include a local binary patterns (LBP) type, a Gaussian Markov random field (GMRF) type, a gray-scale co-occurrence matrix (or gray-level co-occurrence matrix (GLCM)) type, and the like.

A texture feature refers to a feature of a texture, and different objects in an image have different texture features. For example, in FIG. 2, a texture feature of a sky, a texture feature of a building, a texture feature of hair, a texture feature of a face, a texture feature of clothes, a texture feature of grass, and the like are all different.

Figure 3:
FIG. 3 is a schematic diagram of a gradient image according to an embodiment of this application.
Figure 3:
Figure 3:

Gradient image: If a raw image is considered as a two-dimensional discrete function, the gradient image is an image obtained by deriving the two-dimensional discrete function. The following describes the gradient image with reference to FIG. 3. FIG. 3 is a schematic diagram of a gradient image according to an embodiment of this application. Refer to FIG. 3. A raw image and a gradient image are included. The raw image usually includes three channels, and the gradient image usually includes one channel. Therefore, processing a gradient image of the raw image can reduce a computation amount. For example, a computation amount of the gradient image is one third of a computation amount of the raw image.

Figure 4:
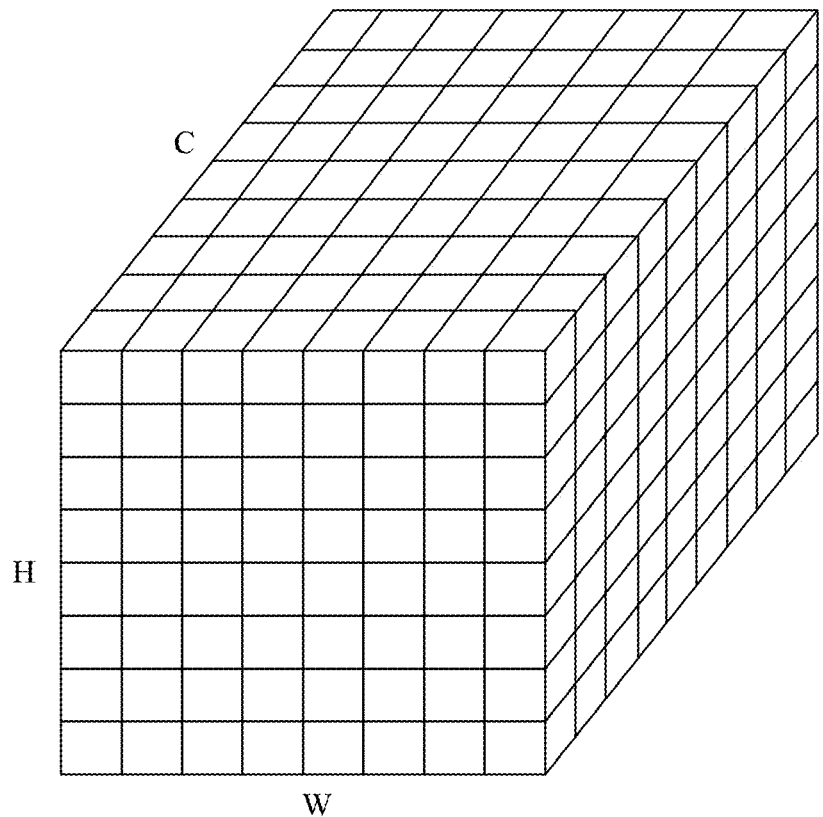
FIG. 4 is a schematic diagram of an image filter according to an embodiment of this application.

An image filter may process an image to improve resolution of the image. An image filter in this application is a three-dimensional filter, and the three dimensions may be denoted as H, W, and C respectively. For ease of understanding, the following describes the image filter with reference to FIG. 4. FIG. 4 is a schematic diagram of an image filter according to an embodiment of this application. Refer to FIG. 4. The image filter is a three-dimensional filter, a horizontal size of the image filter is W, a vertical size of the image filter is H, and a quantity of channels is C. Each grid in FIG. 4 represents one filter parameter, and the image filter includes H*W*C filter parameters. Processing an image by using the image filter is essentially processing the image by using filter parameters in the image filter.

Downsampling refers to compression processing. For example, performing downsampling on an image refers to performing compression processing on the image.

Upsampling refers to amplification processing. For example, performing upsampling on an image refers to performing amplification processing on the image.

In this application, when a super-resolution image of a first image needs to be obtained, an image filter of the first image may be first determined, and then super-resolution processing is performed on the first image by using the image filter, to obtain the super-resolution image of the first image. The image filter includes filter parameters corresponding to each pixel in the first image, and pixels with different texture features in the first image correspond to different filter parameters. In this way, when super-resolution processing is performed on the first image by using the image filter, different super-resolution processing may be performed on the pixels with different texture features in the first image, so that super-resolution processing performed on the pixels in the image is related to texture characteristics of the pixels, an effect of performing super-resolution processing on the image is better, and image processing reliability is improved.

Specific embodiments are used below to describe in detail the technical solutions of this application. It should be noted that the following embodiments may be independent or may be combined with each other, and same or similar content is not described repeatedly in different embodiments.

Figure 9:
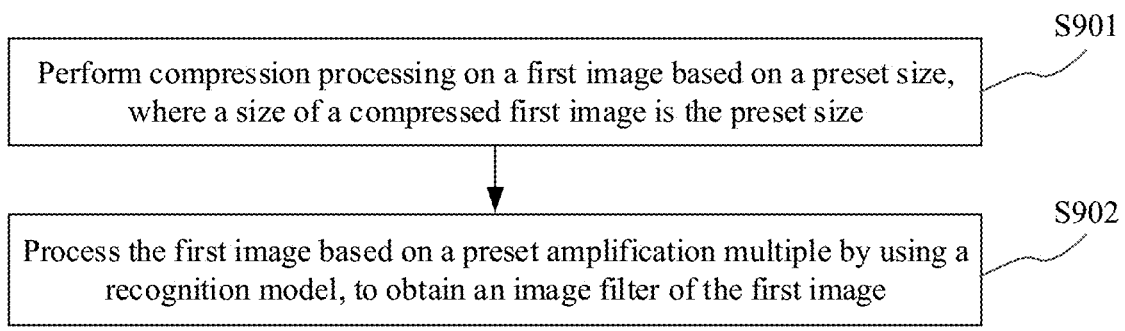
FIG. 9 is a schematic flowchart of another method for determining an image filter according to an embodiment of this application.
Figure 10:
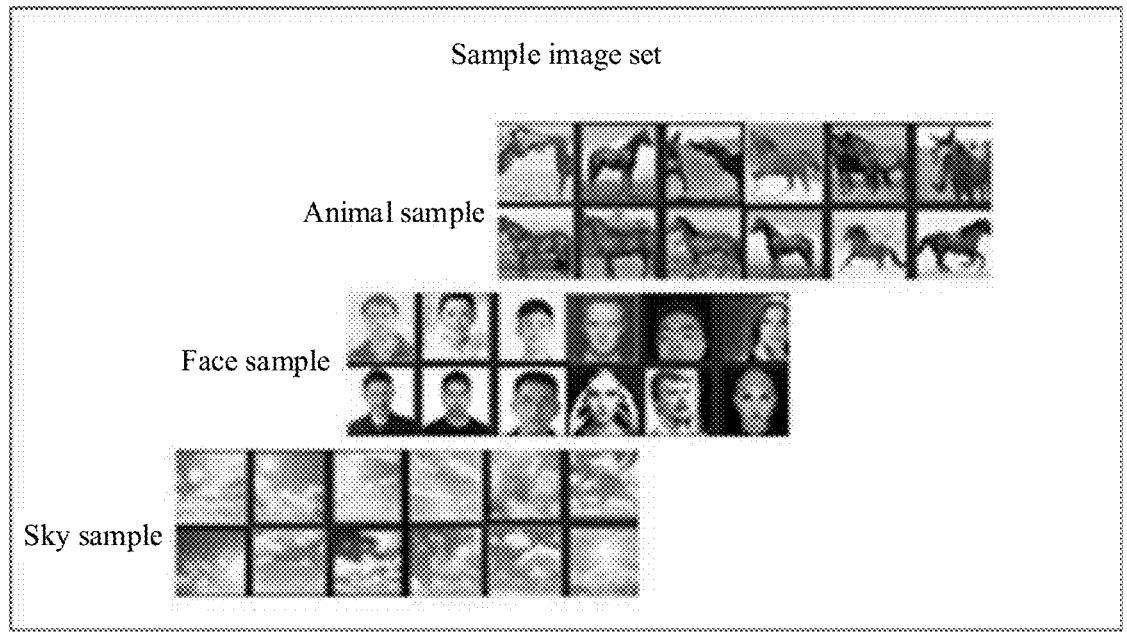
FIG. 10 is a schematic diagram of a sample image set according to an embodiment of this application.
Figure 11:
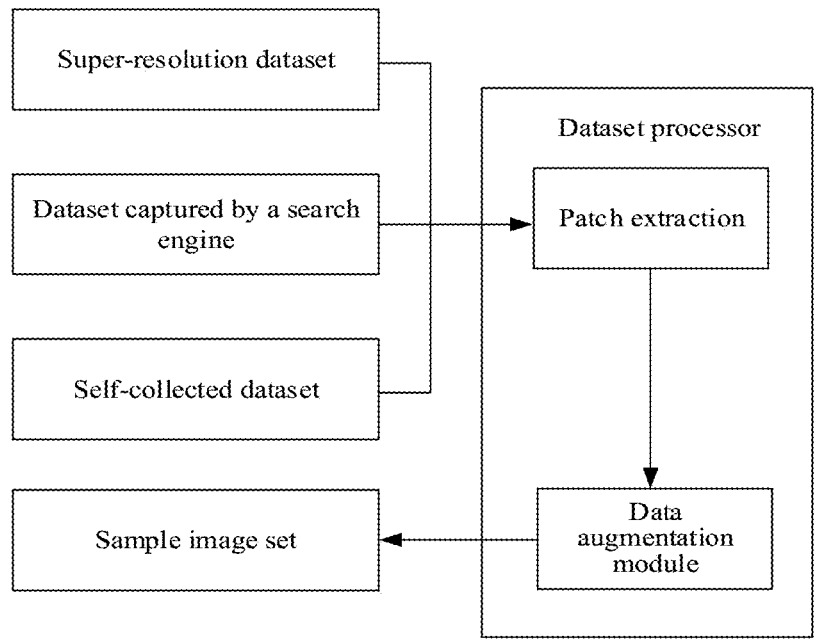
FIG. 11 is a schematic flowchart of a method for obtaining a sample image set according to an embodiment of this application.

For ease of understanding, two manners of determining the image filter corresponding to the first image are first described. Embodiments shown in FIG. 5 to FIG. 8 are a manner of determining an image filter, and embodiments shown in FIG. 9 to FIG. 11 are another manner of determining an image filter.

Figure 5:
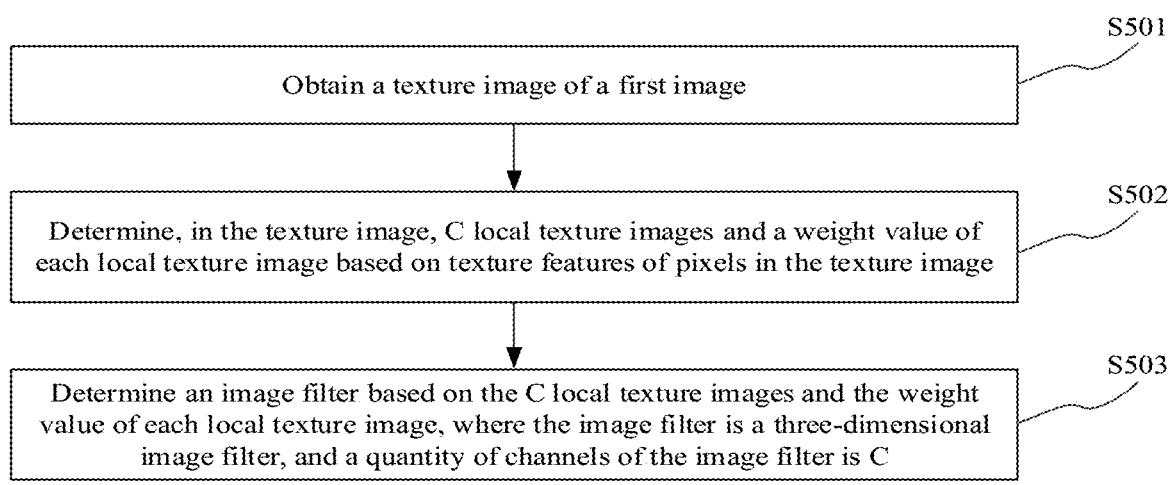
FIG. 5 is a schematic flowchart of a method for determining an image filter according to an embodiment of this application.

FIG. 5 is a schematic flowchart of a method for determining an image filter according to an embodiment of this application. Refer to FIG. 5. The method may include the following steps.

S501: Obtain a texture image of a first image.

The first image is an image on which super-resolution processing is to be performed, and the first image is usually an image with relatively low resolution.

Optionally, the texture image of the first image may be obtained by using a convolutional neural network. For example, the texture image of the first image may be obtained by using any one of an LBP model, a GMRF model, or a GLCM model.

To improve efficiency of obtaining the texture image of the first image, the first image may be first compressed to a preset size (downsampling is performed on the first image to obtain an image of the preset size), and then a texture image of a compressed first image is obtained. Optionally, when a size of the first image is less than the preset size, compression processing may not be performed on the first image. For example, the preset size may be 256*256, 512*512, or the like. In an actual application process, the preset size may be set based on an actual requirement. It should be noted that a size of an image in this application is resolution of the image. For example, that the size of the first image is M*N means that the first image horizontally includes M pixels and vertically N pixels.

A size of the texture image of the compressed first image is the same as a size of the compressed first image. For example, if the size of the first image is M*N and the size of the compressed first image is M1*N1, the size of the texture image of the compressed first image is M1*N1. Because a quantity of pixels included in the compressed first image are reduced, the texture image of the compressed first image can be quickly obtained. Further, the texture image of the compressed first image also includes a relatively small quantity of pixels, so that a data volume for subsequently processing the texture image can be reduced.

S502: Determine, in the texture image, C local texture images and a weight value of each local texture image based on texture features of pixels in the texture image.

$C=f^2 \times t$, f is a preset amplification multiple, and t is a quantity of filter parameters corresponding to each pixel in the first image. f is greater than 1, and t is an integer greater than or equal to 1.

Optionally, a value of t may be preset, $t=a^2$, and a is usually an odd number greater than or equal to 1. For example, a may be 1, 3, 5, 7, or the like.

For example, if the first image needs to be amplified by f=3 times and a quantity of filter parameters corresponding to each pixel $t=3^2=9$, C=81.

Optionally, each local texture image includes a part of textures in the texture image, and textures in one local texture image have a same texture feature. Optionally, one local texture image includes only face textures, and the face textures have a same texture feature. Alternatively, one local texture image includes only sky textures, and the sky textures have a same texture feature.

A size of the local texture image may be equal to the size of the texture image. If the first image is compressed to the preset size in S502, both the size of the texture image and the size of the local texture image are the preset size. If compression processing is not performed on the first image in S502, both the size of the texture image and the size of the local texture image are the same as the size of the first image.

Figure 6:
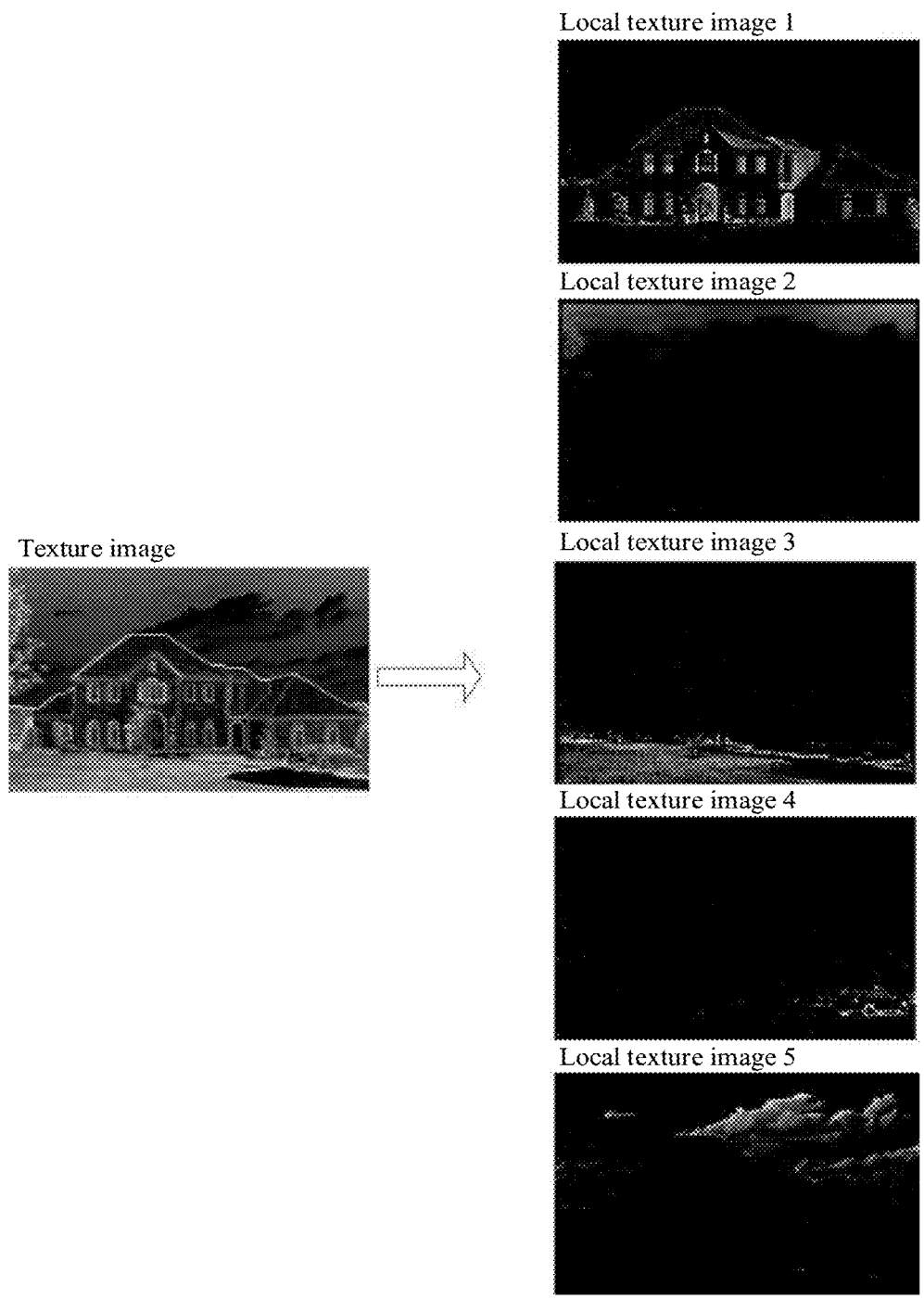
FIG. 6 is a schematic diagram of a local texture image according to an embodiment of this application.

The following describes a process of determining the local texture image with reference to FIG. 6.

FIG. 6 is a schematic diagram of a local texture image according to an embodiment of this application. Refer to FIG. 6. if C is 5, five local texture images may be determined in the texture image, which are separately denoted as a local texture image 1, a local texture image 2, a local texture image 3, a local texture image 4, and a local texture image 5.

Refer to FIG. 6. The local texture image 1 is a local texture image corresponding to a building, and the local texture image 1 includes a texture corresponding to the building. The local texture image 2 is a local texture image corresponding to a sky, and the local texture image 2 includes a texture corresponding to the sky. The local texture image 3 is a local texture image corresponding to grass, and the local texture image 3 includes a texture corresponding to the grass. The local texture image 4 is a local texture image corresponding to an auto, and the local texture image 4 includes a texture corresponding to the auto. The local texture image 5 is a local texture image corresponding to a cloud, and the local texture image 5 includes a texture corresponding to the cloud.

It should be noted that FIG. 6 shows, by way of example, only a part of local texture images that is determined in the texture image. Certainly, another local texture image may be further determined in the texture image. This is not limited in this embodiment of this application.

One local texture image may correspond to one weight value. For example, a weight value of a local texture image may be a number between 0 and 1.

Optionally, the weight value of the local texture image may be determined based on an object type included in the local texture image. For example, a correspondence between the object type and the weight value may be preset. Correspondingly, the weight value of the local texture image may be determined based on the object type included in the local texture image and the correspondence. For example, an object type of an object in the local texture image may be identified, and the weight value of the local texture image may be determined based on the object type and the object correspondence.

Optionally, the weight value of the local texture image may be determined based on a texture feature of a texture in the local texture image. For example, a correspondence between the texture feature and the weight value may be preset. Correspondingly, the weight value of the local texture image may be determined based on the texture feature of the texture in the local texture image and the correspondence.

Optionally, a weight value of each local texture image may be further determined by using a preset model, and the preset model is obtained by learning a plurality of groups of sample images. Each group of sample images may include a sample low-resolution image and a corresponding sample high-resolution image. The plurality of groups of sample images may be input into the preset model, and the preset model may learn the plurality of groups of sample images, to obtain, through learning, a weight value of a sample local texture image corresponding to each sample low-resolution image when a sample low-resolution image is super-resolved into a sample high-resolution image. After the preset model learns the plurality of groups of sample images, the preset model has a function of determining the weight value of each local texture image. Therefore, the local texture image may be input into the preset model, so that the preset model outputs the weight value of the local texture image.

S503: Determine the image filter based on the C local texture images and the weight value of each local texture image, where the image filter is a three-dimensional image filter, and a quantity of channels of the image filter is C.

Optionally, each local texture image may be multiplied by a corresponding weight value to obtain an updated local texture image. Each updated local texture image corresponds to one channel of the image filter, and a pixel value in an updated local texture image is a filter parameter in one channel of the image filter. A horizontal size (W) of the image filter is the same as a horizontal size of the local texture image (a quantity of pixels included in each row of the local texture image), and a vertical size (H) of the image filter is the same as a vertical size of the local texture image (a quantity of pixels included in each column of the local texture image).

An $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image. i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

Figure 7:
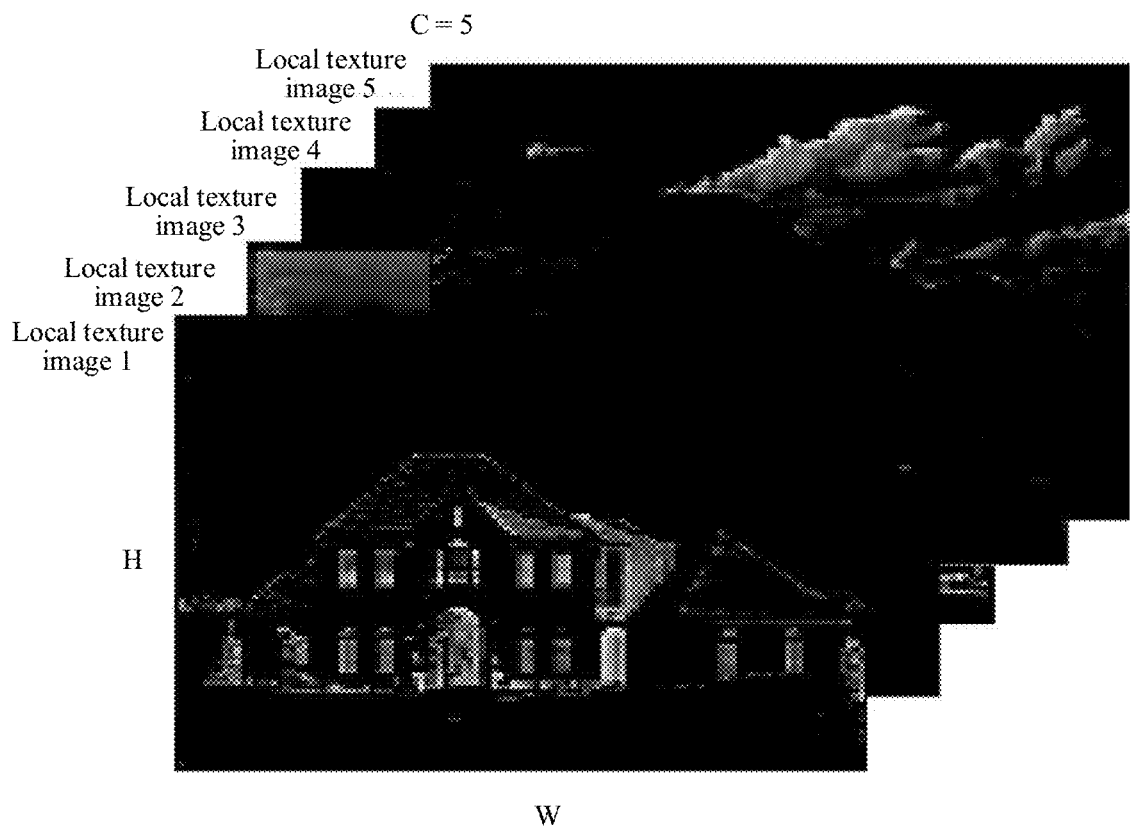
FIG. 7 is a schematic diagram of another image filter according to an embodiment of this application.

The following describes the image filter with reference to FIG. 7.

FIG. 7 is a schematic diagram of another image filter according to an embodiment of this application. Refer to FIG. 7. if C=5, the five local texture images are separately denoted as the local texture image 1, the local texture image 2, the local texture image 3, the local texture image 4, and the local texture image 5. After pixel values of the five local texture images are multiplied by corresponding weight values to obtain updated local texture images, pixel values of the five updated local texture images may be arranged in a manner shown in FIG. 7, and a pixel value of each updated local texture image is a filter parameter of one channel in the image filter.

It should be noted that FIG. 7 shows only a relationship between a local texture image and an image filter, and does not represent a real form of the image filter.

In the foregoing process, a weight value is set for each local texture image, so that a determined filter parameter of the image filter is related to the object type in the image. In this way, when the image is processed by using the image filter, smooth transition can be performed between different regions in a processed image, and an obvious segmentation line can be avoided between the different regions in the processed image.

Figure 8:
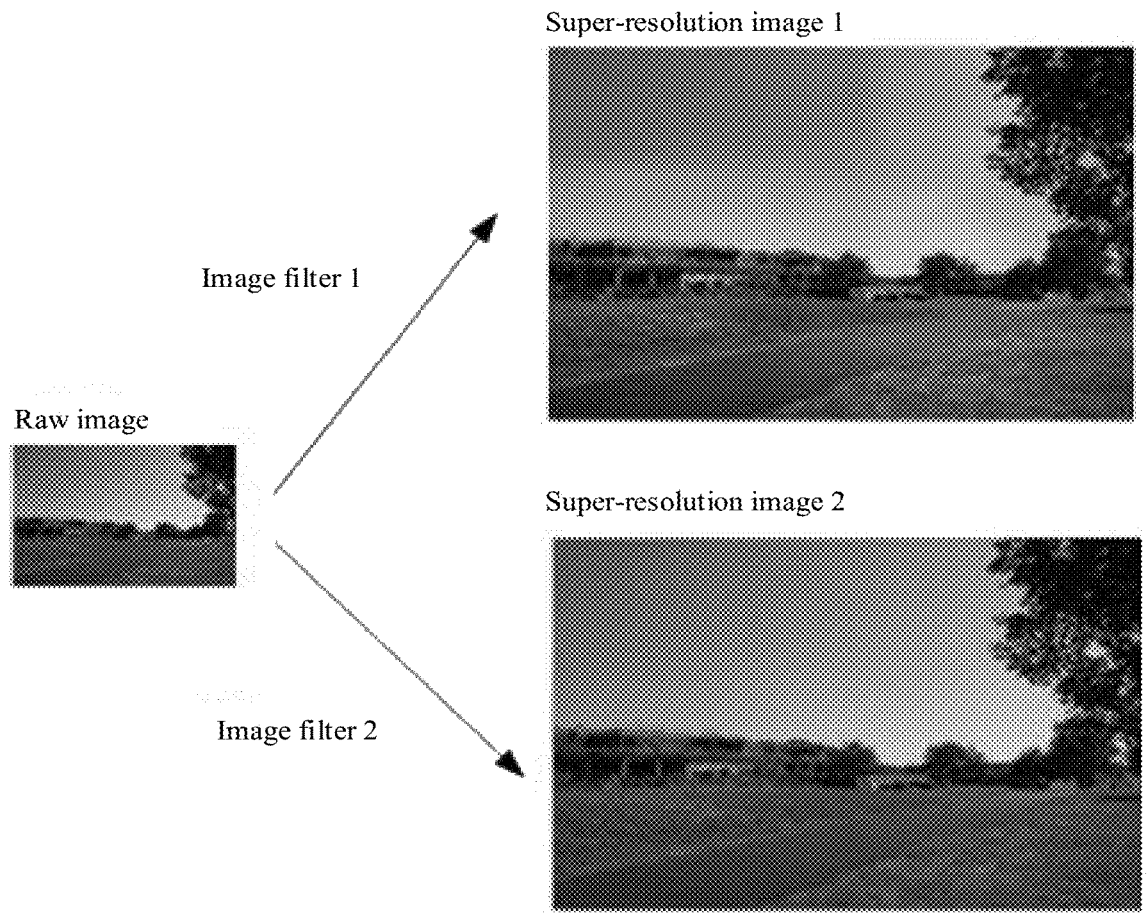
FIG. 8 is a schematic diagram of an image according to an embodiment of this application.

The following describes an image processing effect obtained after the weigh values of the local texture image is used with reference to FIG. 8.

FIG. 8 is a schematic diagram of an image according to an embodiment of this application. Refer to FIG. 8. Super-resolution processing is performed on a raw image by using an image filter 1, to obtain a super-resolution image 1, and super-resolution processing is performed on the raw image by using a filter 2, to obtain a super-resolution image 2. In a process of determining the image filter 1, the weight value of the local texture image is not used, that is, the image filter 1 is directly determined based on the local texture image. In a process of determining the image filter 2, the weight value of the local texture image is used, that is, the image filter 2 is determined based on the local texture image and the weight value of the local texture image.

Refer to FIG. 8. In the super-resolution image 1, there is a relatively obvious segmentation line between a sky in an upper left corner and another part of the image. In other words, a transition between the sky in the upper left corner and the other part of the image is not smooth.

Refer to FIG. 8, in the super-resolution image 2, there is no relatively obvious segmentation line between a sky in an upper left corner and another part of the image. In other words, a transition between the sky in the upper left corner and the other part of the image is smooth.

In the embodiment shown in FIG. 5, the texture image of the first image is first obtained, the plurality of local texture images and the weight value of each local texture image in the texture image are determined, and the image filter is determined based on the local texture image and the weight value of the local texture image. Textures in one local texture image have a same texture feature. Therefore, in the image filter obtained by using the foregoing method, the filter parameters corresponding to each pixel in the first image are included, and the pixels with different texture features correspond to different filter parameters. When super-resolution processing is performed on the first image by using the image filter, different super-resolution processing may be performed on different pixels in the first image based on the image filter, thereby improving image processing reliability.

FIG. 9 is a schematic flowchart of another method for determining an image filter according to an embodiment of this application. Refer to FIG. 9. The method may include the following steps.

S901: Perform compression processing on a first image based on a preset size, where a size of a compressed first image is the preset size.

Optionally, when a size of the first image is greater than the preset size, compression processing may be performed on the first image. Optionally, when the size of the first image is less than the preset size, compression processing may not be performed on the first image.

For example, the preset size may be 256*256, 512*512, or the like. In an actual application process, the preset size may be set based on an actual requirement.

S902: Process the first image by using a recognition model, to obtain an image filter of the first image.

It should be noted that S901 may be an optional step. When S901 is performed, the compressed first image is processed by using the recognition model in S902. In this way, a data processing amount of the recognition model may be reduced, thereby improving efficiency of outputting an image filter by the recognition model. When S901 is not performed, the original first image is processed in S902.

The recognition model is obtained by learning a plurality of groups of samples, each group of samples includes a first sample image and a second sample image, the first sample image and the second sample image have same image content, and resolution of the first sample image is higher than resolution of the second sample image.

Optionally, the first sample image may be a high-resolution image, and the second sample image may be a low-resolution image. For example, the resolution of the first sample image is greater than or equal to a first threshold, and the resolution of the second sample image is less than or equal to a second threshold.

Before the embodiment shown in FIG. 9 is performed, the recognition model may be obtained through pre-learning. The following describes a process of obtaining the recognition model through learning.

Sample images with different texture features are first obtained to obtain a sample image set. For example, the sample image set may be shown in FIG. 10. FIG. 10 is a schematic diagram of a sample image set according to an embodiment of this application. Refer to FIG. 10. The sample image set includes a plurality of animal sample images, a plurality of face sample images, and a plurality of sky sample images.

The following describes, with reference to FIG. 11, a manner of obtaining the sample image set. FIG. 11 is a schematic flowchart of a method for obtaining a sample image set according to an embodiment of this application. Refer to FIG. 11. A super-resolution dataset, a dataset captured by using a search engine, and a self-collected dataset may be first obtained. Each dataset includes a plurality of initial sample images. The initial sample images in each dataset are input into a dataset processor, and the dataset processor processes the initial sample images in each dataset to obtain the sample image set.

Optionally, image segmentation (patch extraction) may be performed on the initial sample image in each data set, to extract required sample images from the initial sample images. For example, an initial sample image that includes a face, a sky, and a building is segmented to obtain sample image that includes only the face, a sample image that includes only the sky, and a sample image that includes only the building. Then, a data augmentation module is used to perform processing such as rotation, stretching, and scaling on the sample images obtained by image segmentation, to obtain the sample image set. Through the foregoing processing, the sample image set may include abundant sample images.

Optionally, the sample image set Dataset={Textureinfo|TextureEAllData}.

Texture is a texture feature, and Data is a texture feature set. Textureinfo is an image with the texture feature Texture, for example, Textureinfo={Sky image|Face image|Animal image . . . }.

After the sample image set is obtained, a plurality of groups of sample images may be determined in the sample image set. For example, for a sample high-resolution image in the sample image set, compression processing is performed on the sample high-resolution image to obtain a corresponding sample low-resolution image, or for a sample low-resolution image in the sample image set, processing may be performed on the sample low-resolution image to obtain a corresponding sample high-resolution image.

After the plurality of groups of sample images are obtained, the plurality of groups of sample images may be input into the recognition model, and the recognition model may learn the plurality of groups of sample images. Because the plurality of groups of sample images include sample images with a plurality of texture characteristics, the recognition model may learn a sample image filter (or a filter parameter) corresponding to a sample low-resolution image in a process in which the sample low-resolution image (the second sample image) with various texture characteristics is super-resolved into a sample high-resolution image (the first sample image). After the recognition model learns the plurality of groups of sample images, the recognition model has a function of determining an image filter of an image. Only when the pixels with different texture features in the image filter correspond to different filter parameters, a high-resolution image obtained through super-resolution by using the image filter is a high-resolution image with a relatively good super-resolution effect. Because a sample high-resolution image in each group of sample images is a high-resolution image with a relatively good super-resolution effect, after the recognition model learns based on the foregoing plurality of groups of sample images, the recognition model has a function of output the image filter of the image, in addition, the output image filter has the following characteristics. The image filter includes filter parameters corresponding to each pixel in the image, and pixels with different texture features correspond to different filter parameters.

Optionally, data representing the first image, a preset amplification multiple, and a quantity t of filter parameters corresponding to each pixel may be input to the recognition model, and the recognition model outputs the image filter of the first image based on received data. The data representing the first image may be the first image, a grayscale image of the first image, or the like. For example, the recognition model may determine a quantity C of channels of the image filter based on a preset amplification multiple f and the quantity t of filter parameters corresponding to each pixel, and determine the image filter based on the quantity C of channels and the data representing the first image. The quantity of channels of the image filter output by the recognition model is C.

Optionally, a process shown in the embodiment in FIG. 9 may be described as follows: $DTF_{(H,W,C)}$=Conv (resize $(Input)_{(H,W)}$), where Input is an input raw image, resize $(Input)_{(H,W)}$ is to scale the input raw image to a size H*W, Conv represents the recognition model (a convolutional neural network), $DTF_{(H,W,C)}$ is the image filter output by the recognition model, H is a vertical size of the image filter, W is a horizontal size of the image filter, and C is the quantity of channels of the image filter.

In the embodiment shown in FIG. 9, the recognition model is obtained through pre-learning, and the image filter of the first image may be obtained by using the recognition model. The recognition model may learn filter parameters corresponding to images with various texture features from low-resolution images to high-resolution images by training the recognition model. Therefore, in the image filter output by the recognition model, the filter parameters of the image filter corresponding to the pixels with different texture features in the first image are different, so that different super-resolution processing may be performed on different pixels in the first image based on the image filter, thereby improving image processing reliability.

After the image filter of the first image is obtained by using any one of the foregoing methods, super-resolution processing may be performed on the first image by using the image filter to obtain a super-resolution image of the first image.

The following describes, by using an embodiment shown in FIG. 12 to FIG. 16, a processing of performing super-resolution on a first image by an image filter.

Figure 12:
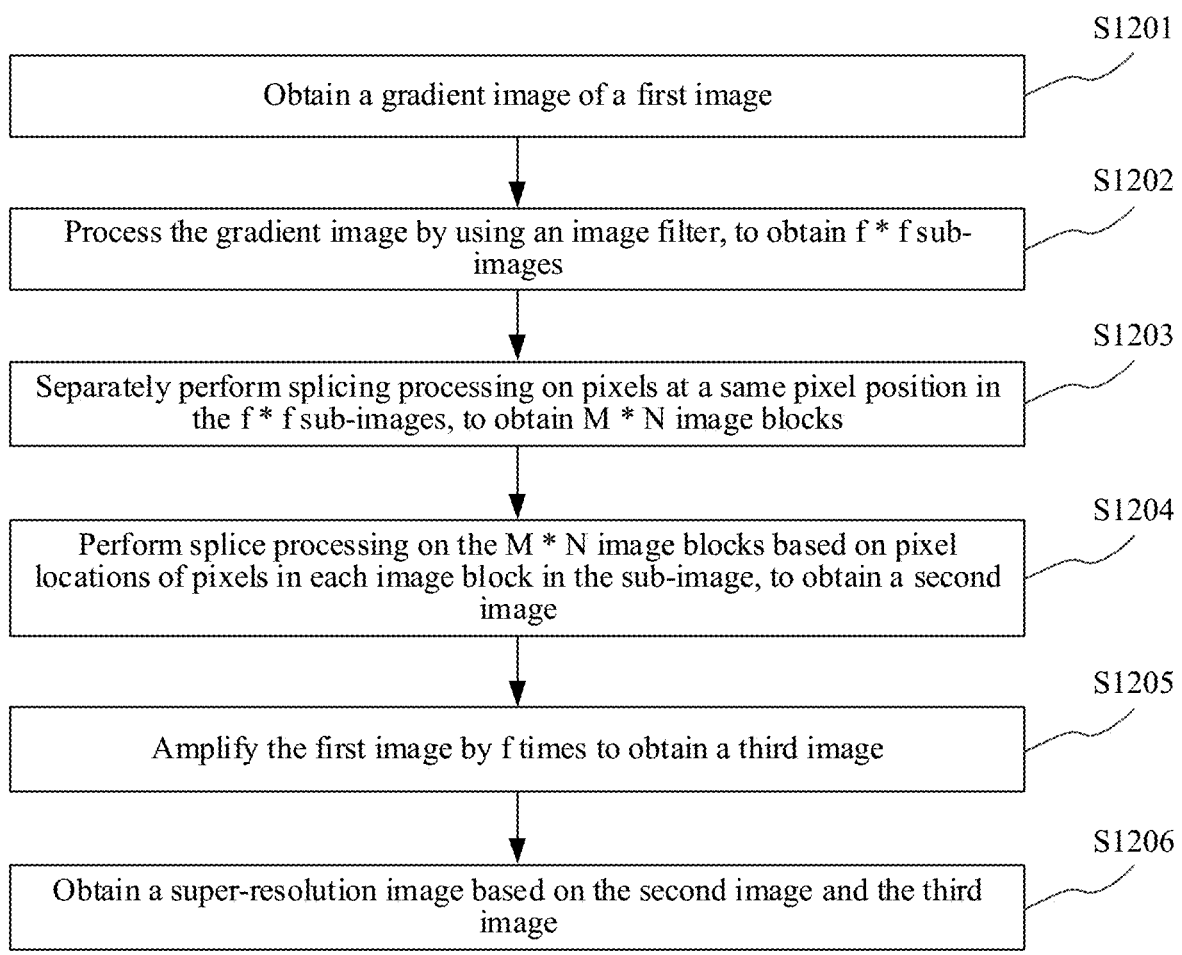
FIG. 12 is a schematic flowchart of a method for performing super-resolution on a first image by an image filter according to an embodiment of this application.

FIG. 12 is a schematic flowchart of a method for performing super-resolution on a first image by an image filter according to an embodiment of this application. Refer to FIG. 12. The method includes the following steps.

S1201: Obtain a gradient image of the first image.

A size of the gradient image is the same as that of the first image, the size of the gradient image is M*N, and M and N are both integers greater than 1.

Optionally, the gradient image of the first image may be obtained by using a convolutional neural network. For example, data representing the first image may be input into the convolutional neural network, and an output of the convolutional neural network is the gradient image of the first image.

Optionally, this step may be described as: $GGF_{(H,W,1)}$=Conv (Input(H,W,3)), where $Input_{(H,W,3)}$ refers to the input first image, a quantity of channels of the first image is 3, the first image is usually a red, green, and blue (RGB) image or a luma, blue projection, and red projection (YUV) image, and $GGF_{(H,W,1)}$ is to output a guided gradient image.

S1202: Process the gradient image by using the image filter, to obtain $f^2$ sub-images.

A size of each sub-image is (f*M)*(f*N).

Optionally, it may be first determined whether H*W (W is a quantity of filter parameters horizontally included in a channel, and H is a quantity of filter parameters vertically included in a channel) of the image filter is consistent with the size of the gradient image (it is determined whether W is the same as a quantity of pixels included in the gradient image horizontally, and H is the same as a quantity of pixels included in the gradient image vertically). If H*W of the image filter is inconsistent with the size of the gradient image, in this case, H*W of the image filter is first adjusted to the size of the gradient image. W of an adjusted image filter is the same as the quantity of pixels included in the gradient image horizontally, and H of the adjusted image filter is the same as the quantity of pixels included in the gradient image vertically.

The gradient image is processed by using parameters in a $(k*t+1)^{th}$ channel to a $(k+1)*t^{th}$ channel in the image filter, to obtain a $k^{th}$ sub-image, where k is sequentially set to 0, 1, ..., and $f^2-1$.

When each sub-image is obtained, a corresponding channel is first determined in the image filter, and the gradient image is processed (each pixel in the gradient image is processed) based on a filter parameter of the corresponding channel in the image filter, to obtain a sub-image. For example, the gradient image is processed by using parameters in a first channel to a $k^{th}$ channel in the image filter, to obtain a $0^{th}$ sub-image. The gradient image is processed by using parameters in a $(t+1)^{th}$ channel to a $2t^{th}$ channel in the image filter, to obtain a first sub-image. The gradient image is processed by using parameters in a $(2t+1)^{th}$ channel to a $3t^{th}$ channel in the image filter, to obtain a second sub-image. The rest may be deduced by analogy, until the $f^2$ sub-images are obtained.

For any sub-image, in a process of obtaining the sub-image, a filter parameter corresponding to each pixel in the gradient image is first determined, and the pixel is processed according to the corresponding filter parameter, to obtain a pixel value of a corresponding pixel in the sub-image. Filter parameters corresponding to pixels in the gradient image may be determined in the following two feasible implementations.

In a feasible implementation, the H*W size of the image filter is the same as the size of the gradient image.

In this feasible implementation, coordinates of the pixels in the gradient image are the same as (h, w) coordinates of the corresponding filter parameters, where h is a positive integer between 0 and H−1, and w is a positive integer between 0 and W−1.

For example, h of a filter parameter corresponding to a pixel (0, 0) in the gradient image is 0, and w is 0. h of a filter parameter corresponding to a pixel (1, 2) in the gradient image is 1, and w is 2.

In the other feasible implementation, H*W of the image filter is different from the size of the gradient image.

In this feasible implementation, a correspondence between coordinates of pixels in the gradient image and (h, w) coordinates of filter parameters may be determined based on a ratio of H*W of the image filter to the size of the gradient image.

For example, if W is a half of a horizontal size of the gradient image, and H is a half of a vertical coordinate of the gradient image, h of filter parameters corresponding to pixels (0, 0), (0, 1), (1, 0), and (1, 1) in the gradient image is 0, and w is 0.

Each pixel in the gradient image corresponds to f filter parameters. There are a plurality of manners of processing one pixel by using the f filter parameters. The following describes, with reference to FIG. 13 and FIG. 14, a process of processing a pixel in a gradient image by using filter parameters.

Figure 13:
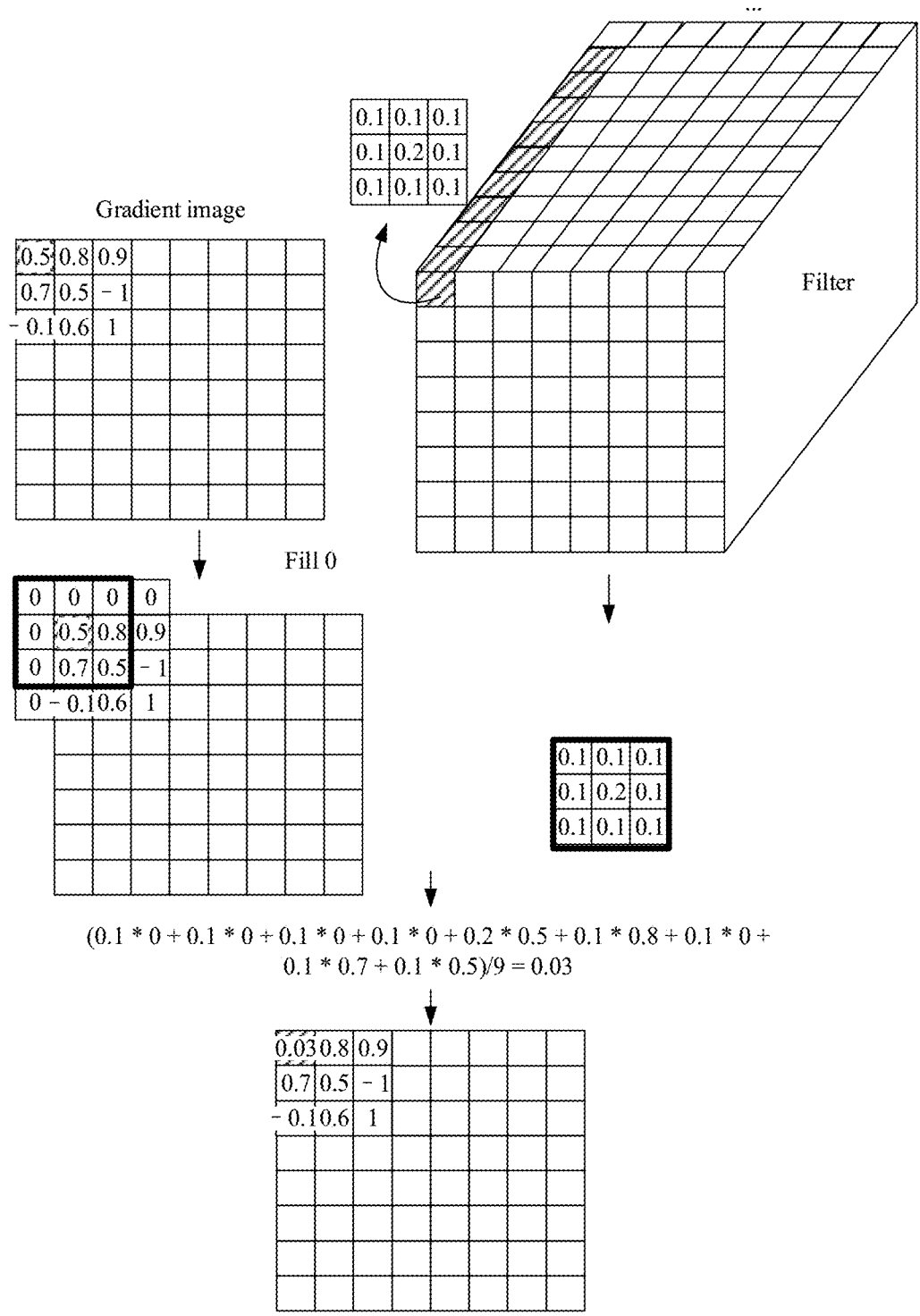
FIG. 13 is a schematic diagram of processing a pixel by using filter parameters according to an embodiment of this application.
Figure 14:
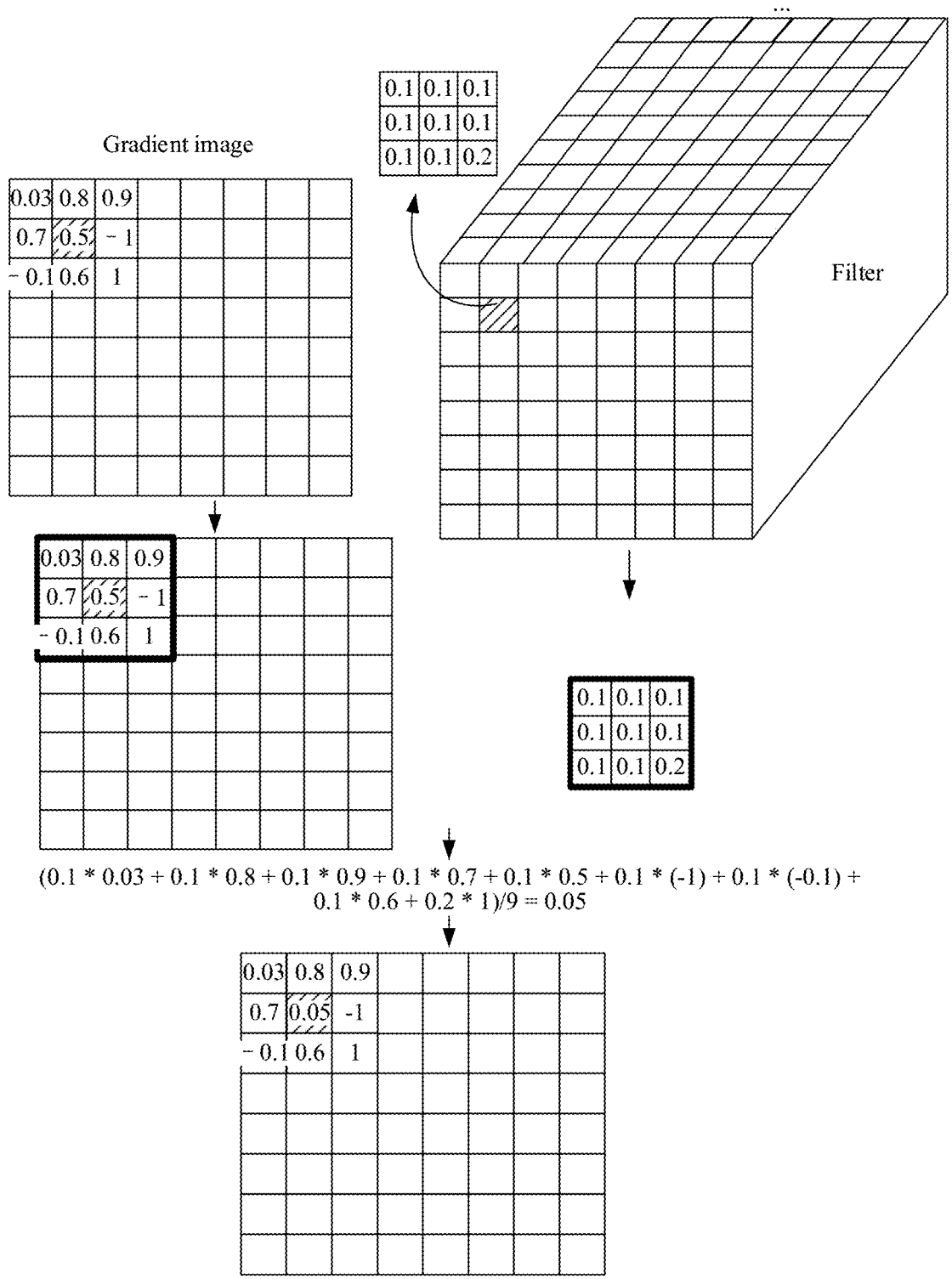
FIG. 14 is another schematic diagram of processing a pixel by using filter parameters according to an embodiment of this application.

FIG. 13 is a schematic diagram of processing a pixel by using filter parameters according to an embodiment of this application. FIG. 14 is another schematic diagram of processing a pixel by using filter parameters according to an embodiment of this application.

Refer to FIG. 13 and FIG. 14, if an amplification multiple f=3 and a quantity of filter parameters corresponding to one pixel is 9, a quantity C of channels of the image filter is 81 (FIG. 13 shows only some channels). When the 0th sub-image is obtained, the gradient image is processed by using parameters in a channel 1 to a channel 9 in the image filter.

Refer to FIG. 13. For the pixel (0, 0) in the gradient image, filter parameters corresponding to the pixel (0, 0) are nine filter parameters in the image filter whose h=0, w=0, and C=1 to 9. It is assumed that a pixel value of the pixel (0, 0) in the gradient image is 0.5, and a matrix formed by the nine filter parameters corresponding to the pixel (0, 0) is $$\begin{pmatrix} 0.1 & 0.1 & 0.1 \\ 0.1 & 0.2 & 0.1 \\ 0.1 & 0.1 & 0.1 \end{pmatrix}.$$

Because there is no pixel around a part of the pixel (0, 0), a pixel 0 may be filled around the pixel (0, 0). A center (0.2) of the matrix is directly opposite to the pixel (0, 0), elements at corresponding positions are multiplied and then added, and an average value is obtained to obtain a pixel value on the pixel (0, 0).

For pixels located at edges in the gradient image, the pixels are processed in the manner shown in FIG. 13.

Refer to FIG. 14. For the pixel (1, 1) in the gradient image, filter parameters corresponding to the pixel (1, 1) are nine filter parameters in the image filter whose h=1, w=1, and C=1 to 9. It is assumed that a pixel value of the pixel (1, 1) in the gradient image is 0.5, and a matrix formed by the nine filter parameters corresponding to the pixel (1, 1) is $$\begin{pmatrix} 0.1 & 0.1 & 0.1 \\ 0.1 & 0.1 & 0.1 \\ 0.1 & 0.1 & 0.2 \end{pmatrix}.$$

A center (0.1) of the matrix is directly opposite to the pixel (1, 1), elements at corresponding positions are multiplied and then added, and an average value is obtained to obtain a pixel value on the pixel (1, 1).

For pixels not located at the edges in the gradient image, the pixels are processed in the manner shown in FIG. 14.

It should be noted that FIG. 13 and FIG. 14 merely illustrate a process of processing a pixel by using filter parameters in a schematic form, but do not limit processing performed on a pixel by using filter parameters.

S1203: Separately perform splicing processing on pixels at a same pixel position in the $f^2$ sub-images, to obtain M*N image blocks.

A size of each image block is f*f.

Optionally, $f^2$ pixels whose coordinates are (0, 0) in the $f^2$ sub-images are spliced, to obtain an image block corresponding to the coordinate (0, 0). $f^2$ pixels whose coordinates are (0, 1) in the $f^2$ sub-images are spliced, to obtain an image block corresponding to the coordinate (0, 1). The rest may be deduced by analogy, until the M*N image blocks are obtained.

Figure 15:
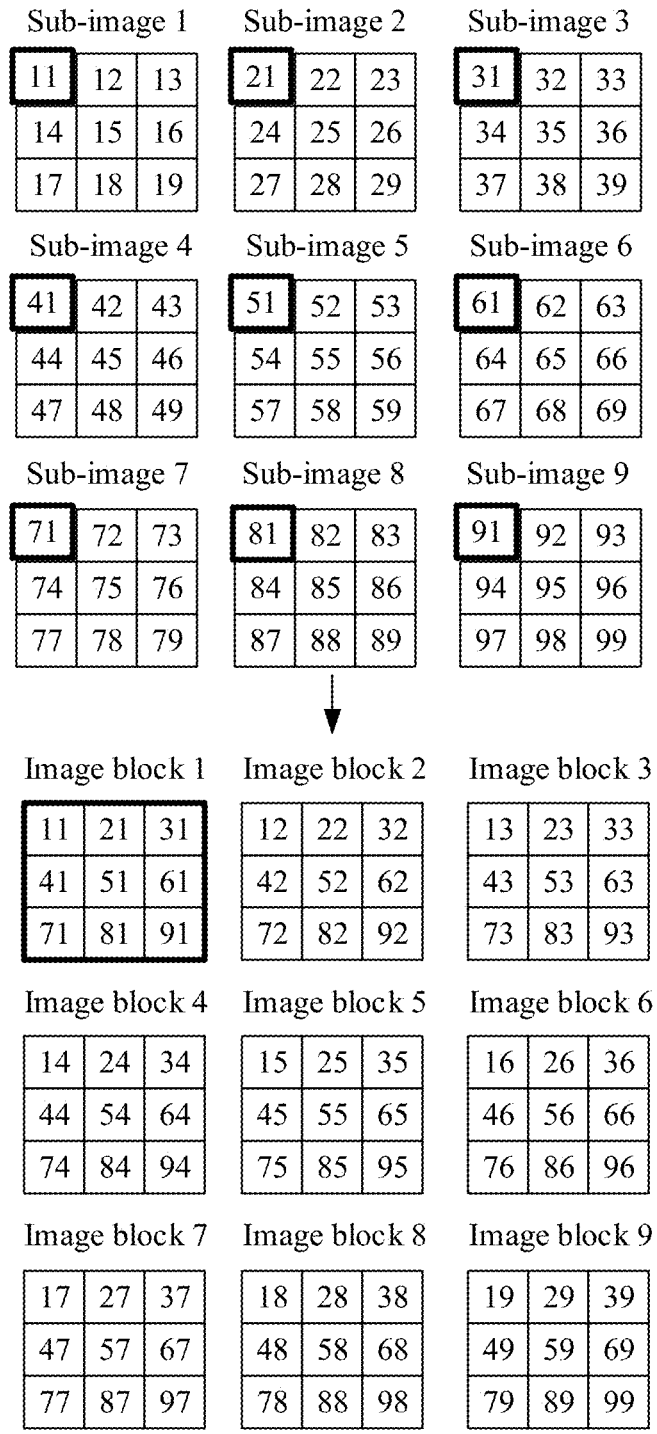
FIG. 15 is a schematic diagram of a process of determining an image block according to an embodiment of this application.

The following describes a process of determining the image block with reference to FIG. 15.

FIG. 15 is a schematic diagram of a process of determining an image block according to an embodiment of this application. Refer to FIG. 15. If f=3, nine sub-images are determined, which are respectively denoted as a sub-image 1, a sub-image 2, . . . , and a sub-image 9. Nine pixels whose coordinates are (0, 0) in the nine sub-images are spliced to obtain an image block 1 corresponding to the coordinate (0, 0), nine pixels whose coordinates are (0, 1) in the nine sub-images are spliced to obtain an image block 2 corresponding to the coordinate (0, 1), . . . , and nine pixels whose coordinates are (2, 2) in the nine sub-images are spliced to obtain an image block 9 corresponding to the coordinate (2, 2).

It should be noted that, numbers in the sub-images and the image blocks shown in FIG. 15 are numbers of pixels. For example, "11" in the sub-image 1 is a number of a pixel (0, 0) in the sub-image 1, and "12" in the sub-image 1 is a number of a pixel (0, 1) in the sub-image 1. "11" in the sub-image 1 is a number of a pixel (0, 0) in the image block 1, and "21" in the sub-image 11 is a number of a pixel (0, 1) in the image block 1.

S1204: Perform splice processing on the M*N image blocks based on pixel locations of pixels in each image block in the sub-image, to obtain the second image.

A size of the second image is (f*M)*(f*N).

Optionally, a position of each image block may be determined based on a pixel position of a pixel in each image block in the sub-image, and splicing processing is performed on the M*N image blocks based on the placement position of each image block. The position of each image block corresponds to a pixel location of a pixel in the image block in the sub-image.

For example, if a pixel position of a pixel in the image block 1 in the sub-image is (0, 0), and a pixel position of a pixel in the image block 2 in the sub-image is (0, 1), a position of the image block 2 is located after the image block 1.

Figure 16:
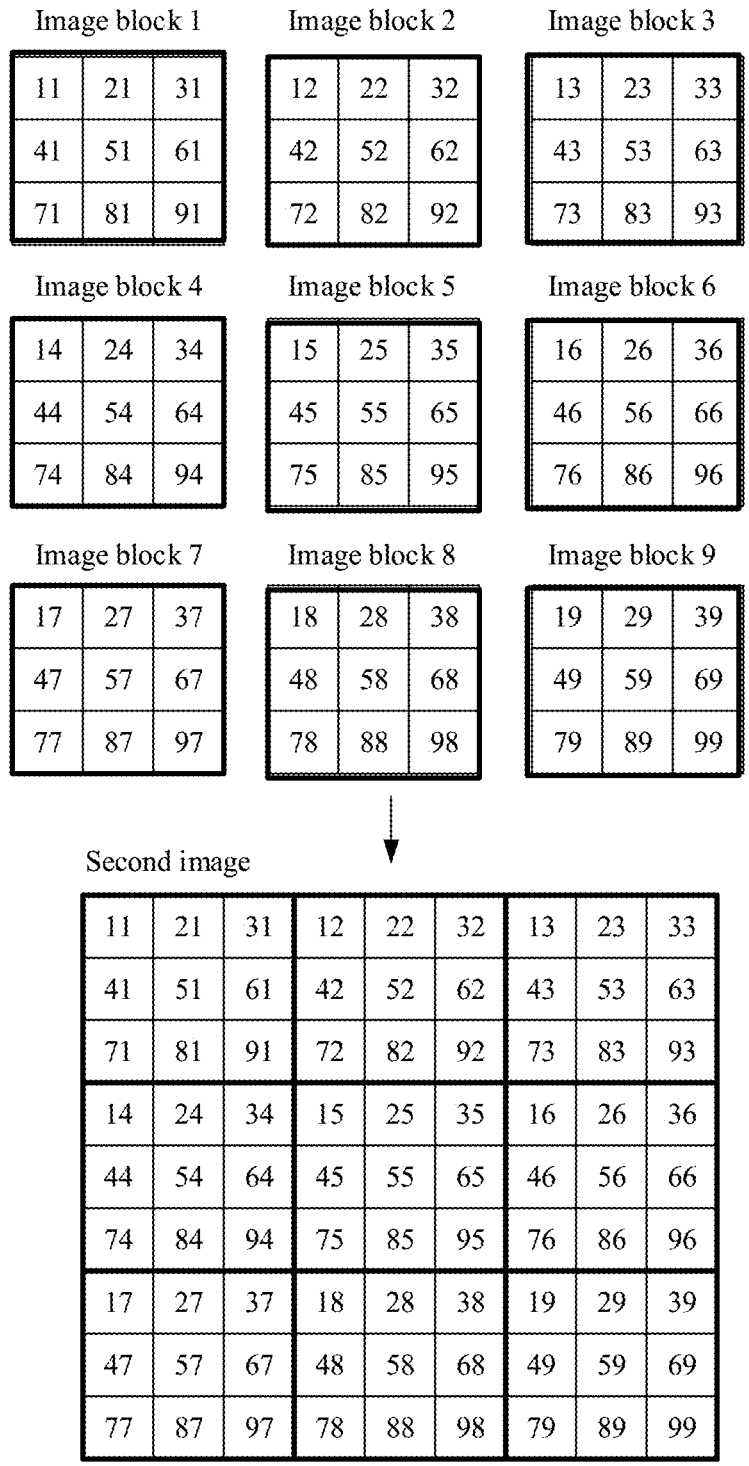
FIG. 16 is a schematic diagram of a process of splicing image blocks according to an embodiment of this application.

The following describes a process of splicing the image blocks with reference to FIG. 16.

FIG. 16 is a schematic diagram of a process of splicing image blocks according to an embodiment of this application. Refer to FIG. 16. it is assumed that nine image blocks are obtained, which are respectively denoted as the image block 1, the image block 2, . . . , and the image block 9. It is assumed that pixel locations of pixels in the nine image blocks are shown in FIG. 15. The second image shown in FIG. 16 is obtained by splicing the nine image blocks based on the pixel locations, in the sub-image, of pixels in an image block.

It should be noted that, numbers in the image blocks and the second image shown in FIG. 16 are numbers of pixels. For example, "11" in the image block 1 is a number of the pixel (0, 0) in the image block 1, and "21" in the image block 11 is a number of the pixel (0, 1) in the image block 1. "11" in the second image is a number of a pixel (0, 0) in the second image, and "21" in the second image is a number of a pixel (0, 1) in the second image.

Optionally, S1202 to S1204 may be described as: $DTFS_{(H,W,C)} = Conv(GGF_{(H,W,1)}, DTF_{(H,W,C)})$, where $GGF_{(H,W,1)}$ represents the gradient image, $DTF_{(H,W,C)}$ represents the image filter, and $DTFS_{(H,W,C)}$ represents a feature map of fine texture adjustment after the gradient image is fused with the image filter.

According to the steps shown in S1202 to S1204, the second image may be determined based on the image filter and the gradient image. Certainly, the second image may be alternatively determined in another feasible implementation. This is not limited in this embodiment of this application.

S1205: Amplify the first image by f times to obtain a third image.

A size of the third image is (f*M)*(f*N).

Optionally, the first image may be amplified by f times in a manner of bicubic interpolation amplification, to obtain the third image. Certainly, the first image may be alternatively amplified in another feasible implementation. This is not limited in this embodiment of this application.

S1206: Obtain a super-resolution image based on the second image and the third image.

A size of the super-resolution image is (f*M)*(f*N).

Optionally, pixel values in the third image and pixel values in the second image may be correspondingly added to obtain the super-resolution image.

For example, a pixel value at a pixel position (0,0) in the third image and a pixel value at a pixel position (0,0) in the second image may be added together to serve as a pixel value at a pixel position (0,0) in the super-resolution image.

In the embodiment shown in FIG. 12, after the image filter is determined, the gradient image of the first image is first processed by using the image filter to obtain the second image, and then the super-resolution image is obtained based on the second image and the third image that is obtained by amplifying the first image. A data volume of the gradient image is less than a data volume of the first image. Therefore, the gradient image may be quickly processed by using the image filter, so that the super-resolution image may be quickly determined.

Figure 17:
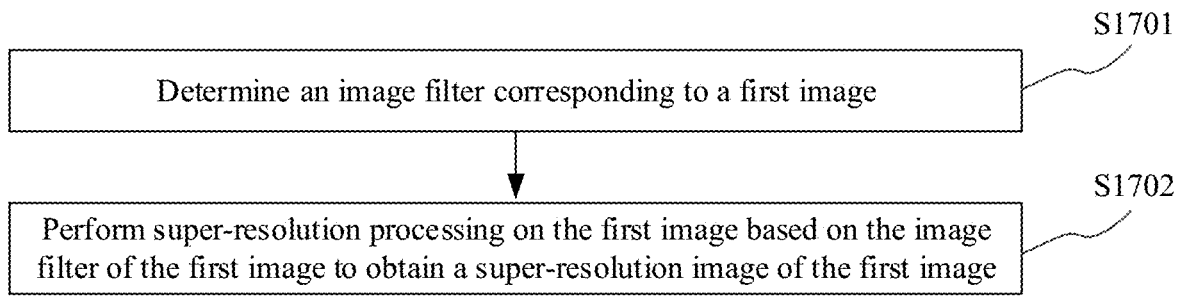
FIG. 17 is a schematic flowchart of an image processing method according to an embodiment of this application.

The following describes, with reference to FIG. 17, an image processing method.

FIG. 17 is a schematic flowchart of an image processing method according to an embodiment of this application. Referring to FIG. 17, the method may include the following steps.

S1701: Determine an image filter corresponding to a first image.

Pixels with different texture features in the first image correspond to different filter parameters of the image filter.

It should be noted that the image filter may be determined by using the methods shown in the embodiment in FIG. 5 to FIG. 8, or the image filter may be determined by using the methods shown in FIG. 9 to FIG. 11. Details are not described herein again.

S1702: Perform super-resolution processing on the first image based on the image filter of the first image to obtain a super-resolution image of the first image.

It should be noted that the super-resolution processing may be performed on the first image by using the methods shown in the embodiment in FIG. 12 to FIG. 16 to obtain the super-resolution image of the first image. Details are not described herein again.

Optionally, this step may be represented as: $HR_{(H,W)} = Conv(DTFS_{(H,W,C)}, LR_{(H/f,W/f)})$, where $HR_{(H,W)}$ is the super-resolution image, $DTFS_{(H,W,C)}$ is the second image, $LR_{(H/f,W/f)}$ is the first image, H is a horizontal size of the first image, W is a vertical size of the first image, and f is an amplification multiple.

According to the image processing method provided in this embodiment of this application, when the super-resolution image of the first image needs to be obtained, the image filter of the first image may be first determined, and then super-resolution processing is performed on the first image by using the image filter, to obtain the super-resolution image of the first image. There is a correspondence between the filter parameters in the image filter and the pixels in the first image, and the pixels with different texture features in the first image correspond to different filter parameters of the image filter. In this way, when super-resolution processing is performed on the first image by using the image filter, different super-resolution processing may be performed on pixels with different texture features in the first image, so that super-resolution processing performed on the pixels in the image is related to the texture characteristics of the pixel, an effect of performing super-resolution processing on the image is better, and image processing reliability is improved.

Figure 18:
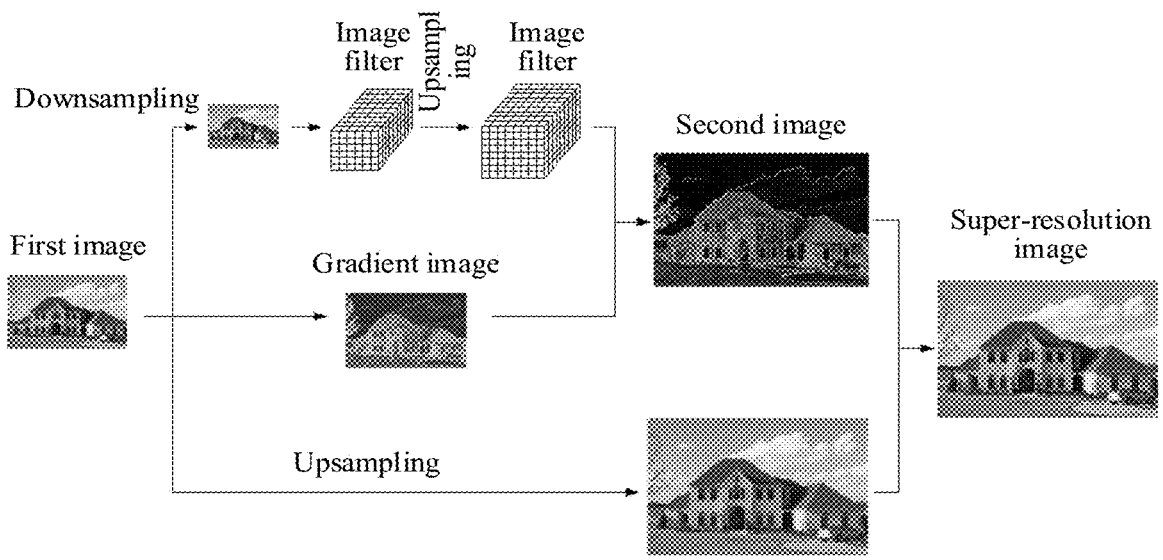
FIG. 18 is a schematic diagram of a process of image processing according to an embodiment of this application.

The following describes a process of image processing with reference to FIG. 18.

FIG. 18 is a schematic diagram of a process of image processing according to an embodiment of this application. Refer to FIG. 18. When super-resolution processing is required to be performed on a raw image (a first image), downsampling is performed on the first image, and an image filter is determined by using the methods shown in the embodiment in FIG. 5 to FIG. 8, or the image filter is determined by using the methods shown in the embodiment in FIG. 9 to FIG. 11. After the image filter is determined, upsampling is performed on the image filter, so that an H*W size of the image filter obtained after upsampling is the same as a size of the first image.

A gradient image of the first image is further obtained, and the image filter and the gradient image are processed by using the methods shown in the embodiment in FIG. 12 to FIG. 16, to obtain a second image. Upsampling is performed on the first image to obtain an amplified image, and the second and the amplified image are processed by using the methods shown in the embodiment in FIG. 12 to FIG. 16, to obtain a super-resolution image.

In the embodiment shown in FIG. 18, the first image includes objects such as a sky, a cloud, a car, a building, and grass. In a process of performing super-resolution processing on the first image, different objects correspond to different filter coefficients. In this way, different super-resolution processing may be performed on different objects in the first image, so that problems such as sawtooth, white borders, and blurring that occur on some objects because same super-resolution processing is performed on all objects in the image can be avoided, and the super-resolution image is more real and natural. This improves image processing reliability.

The image processing method shown in the foregoing embodiments may be applied to a plurality of application scenarios. For example, the image processing method shown in the foregoing embodiment may be applied to display an image by a terminal device. To be specific, before the terminal device displays an image, super-resolution processing is performed on the image by using the image processing method shown in the foregoing embodiment, so that the image displayed by the terminal device is clearer and more natural. For example, the image processing method shown in the foregoing embodiments may be further applied to a video call scenario of the terminal device. To be specific, in a process in which the terminal device performs video passing with another terminal device, the terminal device may receive a video frame from the other terminal device, and the terminal device may perform super-resolution processing on each frame of image in the video frame by using the method shown in the foregoing embodiment, so that a video picture displayed by the terminal device is clearer and more natural. For example, the image processing method shown in the foregoing embodiments may be further applied to a scenario in which the terminal device plays a video. To be specific, in a process in which the terminal device plays the video, the terminal device may perform super-resolution processing on each frame of image in a video frame by using the method shown in the foregoing embodiment, so that a video picture displayed by the terminal device is clearer and more natural. For example, the image processing method shown in the foregoing embodiments may be further applied to a game scenario. To be specific, before the terminal device displays a game picture, the terminal device may perform super-resolution processing on the game picture by using the method shown in the foregoing embodiment, so that the game picture displayed by the terminal device is clearer and more natural.

Optionally, the terminal device in this embodiment of this application may be a mobile phone, a computer, a television, an in-vehicle terminal (or an unmanned driving system), an augmented reality (AR) device, a virtual reality (VR) device, a hybrid reality device, a wearable device, a smart home device, an unmanned aerial vehicle terminal device, or the like.

Certainly, the image processing method shown in the foregoing embodiment may be further applied to another application scenario. This is not limited in this embodiment of this application.

Figure 19:
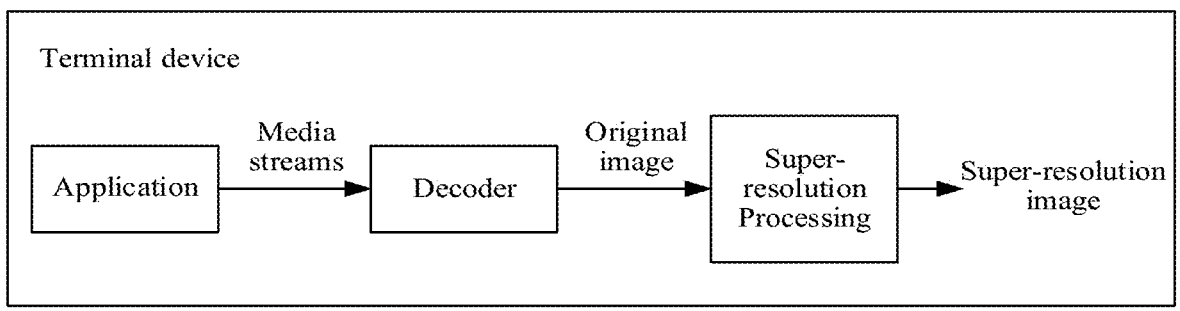
FIG. 19 is a schematic diagram of an application scenario according to an embodiment of this application.

The following describes, with reference to FIG. 19, an application scenario of an image processing method.

FIG. 19 is a schematic diagram of an application scenario according to an embodiment of this application. Refer to FIG. 19. An application program is installed on a terminal device. For example, the application program may be an image display application program, a video playing application program, a video call application program, or the like. The application program may obtain a media stream (for example, a video stream). A decoder in the terminal device decodes the media stream to obtain a raw image. The terminal device performs super-resolution processing on the raw image by using the image processing method shown in the foregoing embodiments, to obtain a super-resolution image. The terminal device displays the super-resolution image.

Optionally, when the media stream is a video stream, when a video frame is processed by using the image processing method shown in this embodiment of this application, because content (or a scenario) in a video usually does not change in a short time, to improve processing efficiency, an image filter may be determined once every T frames. In other words, an image filter determined based on one image frame may be applied to T−1 image frames after the frame. For example, T may be any quantity ranging from 5 to 10.

Optionally, the image processing method shown in the foregoing embodiments may be implemented by using a processing model. For example, sample data may be obtained, and the sample data may be trained to obtain the processing model. The processing model may implement the foregoing image processing method. Optionally, in an actual application process, training may be performed on a personal computer (PC) based on the sample data to obtain the foregoing processing model, the foregoing processing model is converted into an offline model on the computer, and the offline model may be moved to any other terminal device (for example, a mobile device such as a mobile phone or a tablet computer), so that the terminal device may perform image processing by using the processing model.

It should be noted that, for a training process of the processing model, refer to the training process of the recognition model in the foregoing embodiments. Details are not described herein again.

Figure 20:
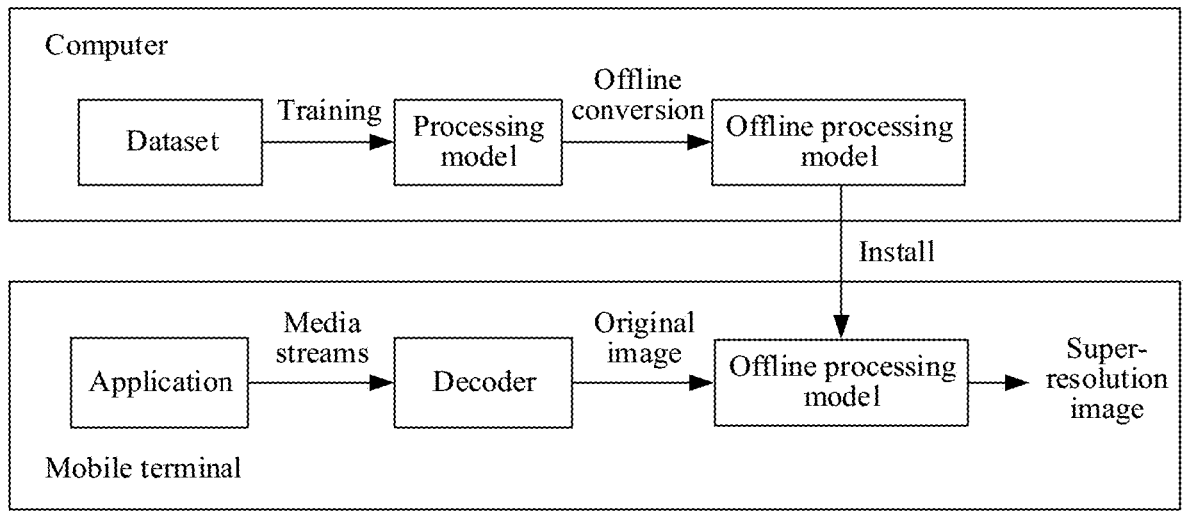
FIG. 20 is a schematic diagram of a process of generating and using a processing model according to an embodiment of this application.

The following describes a process of generating and using the processing model with reference to FIG. 20.

FIG. 20 is a schematic diagram of a process of generating and using a processing model according to an embodiment of this application. Refer to FIG. 20. The processing model may be obtained through training on a PC based on sample data, and the foregoing processing model is converted into an offline model on a computer. The offline model is installed on a mobile terminal. For example, after an application program in the mobile terminal obtains a media stream (for example, a video stream), a decoder in a terminal device decodes the media stream to obtain a raw image. The terminal device performs super-resolution processing on the raw image by using the offline processing model, to obtain a super-resolution image. The terminal device displays the super-resolution image.

Figure 21:
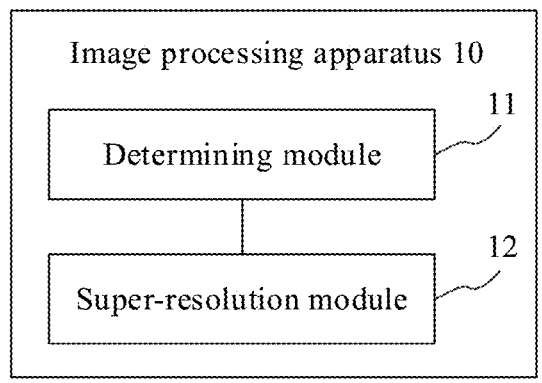
FIG. 21 is a schematic structural diagram of an image processing apparatus according to an embodiment of this application.

FIG. 21 is a schematic structural diagram of an image processing apparatus according to an embodiment of this application. Refer to FIG. 21. The image processing apparatus 10 may include a determining module 11 and a super-resolution module 12.

The determining module 11 is configured to determine an image filter corresponding to a first image, where the image filter includes filter parameters corresponding to each pixel in the first image, and pixels with different texture features correspond to different filter parameters.

The super-resolution module 12 is configured to perform super-resolution processing on the first image based on the image filter of the first image to obtain a super-resolution image of the first image.

Optionally, the determining module 11 may perform S501 to S503 in the embodiment in FIGS. 5, S901 and S902 in the embodiment in FIGS. 9, and S1701 in the embodiment in FIG. 17.

Optionally, the super-resolution module may perform S1201 to S1206 in the embodiment in FIGS. 12, and S1702 in the embodiment in FIG. 17.

It should be noted that the image processing apparatus shown in the embodiments of this application may perform the technical solutions shown in the foregoing method embodiments. Implementation principles and beneficial effects of the image processing apparatus are similar to those of the technical solutions, and details are not described herein again.

In a possible implementation, the determining module 11 is further configured to obtain a texture image of the first image, determine, in the texture image, C local texture images and a weight value of each local texture image based on texture features of pixels in the texture image, where textures in the local texture images have a same texture feature, $C=f^2 \times t$, f is a preset amplification multiple, t is a quantity of filter parameters corresponding to each pixel in the first image, f is greater than 1, and t is an integer greater than or equal to 1, and determine the image filter based on the C local texture images and the weight value of each local texture image, where a quantity of channels of the image filter is C.

In a possible implementation, the determining module 11 is further configured to perform compression processing on the first image based on a preset size, where a size of a compressed first image is the preset size, and determine the texture image based on the compressed first image.

In a possible implementation, an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image. i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

In a possible implementation, the determining module 11 is further configured to process the first image by using a recognition model, to obtain the image filter of the first image, where the recognition model is obtained by learning a plurality of groups of samples, each group of samples includes a first sample image and a second sample image, the first sample image and the second sample image have same image content, and resolution of the first sample image is higher than resolution of the second sample image.

In a possible implementation, the determining module 11 is further configured to perform compression processing on the first image based on a preset size, where a size of a compressed first image is the preset size, and process the compressed first image by using the recognition model.

In a possible implementation, the super-resolution module 12 is further configured to obtain a gradient image of the first image, where a size of the gradient image is the same as that of the first image, the size of the gradient image is M*N, and M and N are both integers greater than 1, process the gradient image by using the image filter, to obtain a second image, where a size of the second image is (f*M)*(f*N), and f is a preset amplification multiple, amplify the first image by f times to obtain a third image, where a size of the third image is (f*M)*(f*N), and obtain the super-resolution image based on the second image and the third image, where a size of the super-resolution image is (f*M)*(f*N).

In a possible implementation, the super-resolution module 12 is further configured to process the gradient image by using the image filter, to obtain $f^2$ sub-images, where a size of each sub-image is (f*M)*(f*N), and determine the second image based on the $f^2$ sub-images.

In a possible implementation, the super-resolution module 12 is further configured to process the gradient image by using parameters in a $(k*t+1)^{th}$ channel to a $(k+1)*t^{th}$ channel in the image filter, to obtain a $k^{th}$ sub-image, where k is sequentially set to 0, 1, . . . , and $f^2-1$.

In a possible implementation, the super-resolution module 12 is further configured to separately perform splicing processing on pixels at a same pixel position in the $f^2$ sub-images, to obtain M*N image blocks, where a size of each image block is f*f, and perform splice processing on the M*N image blocks based on pixel locations of pixels in each image block in the sub-image, to obtain the second image.

It should be noted that the image processing apparatus shown in the embodiments of this application may perform the technical solutions shown in the foregoing method embodiments. Implementation principles and beneficial effects of the image processing apparatus are similar to those of the technical solutions, and details are not described herein again.

Figure 22:
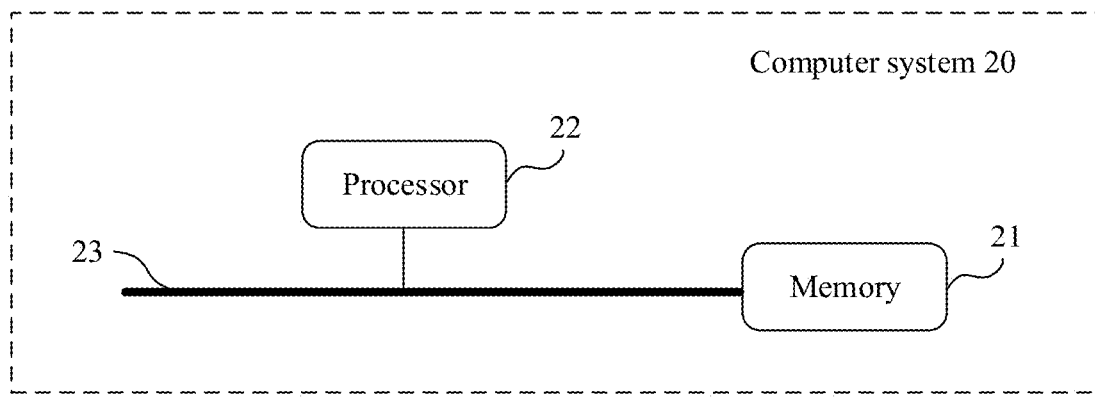
FIG. 22 is a schematic structural diagram of hardware of a computer system according to an embodiment of this application.

FIG. 22 is a schematic structural diagram of hardware of a computer system according to an embodiment of this application. Refer to FIG. 22. The computer system 20 includes a memory 21 and a processor 22, where the memory 21 communicates with the processor 22. For example, the memory 21 and the processor 22 may communicate with each other through a communications bus 23. The memory 21 is configured to store a computer program, and the processor 22 executes the computer program to perform the following steps of determining an image filter corresponding to a first image, where the image filter includes filter parameters corresponding to each pixel in the first image, and pixels with different texture features correspond to different filter parameters, and performing super-resolution processing on the first image based on the image filter of the first image to obtain a super-resolution image of the first image.

Optionally, the processor 21 may implement functions of the determining module 11 and the super-resolution module 12 shown in the embodiment in FIG. 21.

It should be noted that the image processing apparatus shown in the embodiments of this application may perform the technical solutions shown in the foregoing method embodiments. Implementation principles and beneficial effects of the image processing apparatus are similar to those of the technical solutions, and details are not described herein again.

In a possible implementation, the processor 22 is further configured to obtain a texture image of the first image, determine, in the texture image, C local texture images and a weight value of each local texture image based on texture features of pixels in the texture image, where textures in the local texture images have a same texture feature, $C=f^2 \times t$, f is a preset amplification multiple, t is a quantity of filter parameters corresponding to each pixel in the first image, f is greater than 1, and t is an integer greater than or equal to 1, and determine the image filter based on the C local texture images and the weight value of each local texture image, where a quantity of channels of the image filter is C.

In a possible implementation, the processor 22 is further configured to perform compression processing on the first image based on a preset size, where a size of a compressed first image is the preset size, and determine the texture image based on the compressed first image.

In a possible implementation, an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image. i is a positive integer less than or equal to C, x is a positive integer less than or equal to M, y is a positive integer less than or equal to N, M is a quantity of pixels horizontally included in the first image, N is a quantity of pixels vertically included in the first image, and M and N are both integers greater than 1.

In a possible implementation, the processor 22 is further configured to process the first image by using a recognition model, to obtain the image filter of the first image, where the recognition model is obtained by learning a plurality of groups of samples, each group of samples includes a first sample image and a second sample image, the first sample image and the second sample image have same image content, and resolution of the first sample image is higher than resolution of the second sample image.

In a possible implementation, the processor 22 is further configured to perform compression processing on the first image based on a preset size, where a size of a compressed first image is the preset size, and process the compressed first image by using the recognition model.

In a possible implementation, the processor 22 is further configured to obtain a gradient image of the first image, where a size of the gradient image is the same as that of the first image, the size of the gradient image is M*N, and M and N are both integers greater than 1, process the gradient image by using the image filter, to obtain a second image, where a size of the second image is (f*M)*(f*N), and f is a preset amplification multiple, amplify the first image by f times to obtain a third image, where a size of the third image is (f*M)*(f*N), and obtain the super-resolution image based on the second image and the third image, where a size of the super-resolution image is (f*M)*(f*N).

In a possible implementation, the processor 22 is further configured to process the gradient image by using the image filter, to obtain $f^2$ sub-images, where a size of each sub-image is (f*M)*(f*N), and determine the second image based on the $f^2$ sub-images.

In a possible implementation, the processor 22 is further configured to process the gradient image by using parameters in a $(k*t+1)^{th}$ channel to a $(k+1)*t^{th}$ channel in the image filter, to obtain a $k^{th}$ sub-image, where k is sequentially set to 0, 1, . . . , and $f^2-1$.

In a possible implementation, the processor 22 is further configured to separately perform splicing processing on pixels at a same pixel position in the $f^2$ sub-images, to obtain M*N image blocks, where a size of each image block is f*f, and perform splice processing on the M*N image blocks based on pixel locations of pixels in each image block in the sub-image, to obtain the second image.

It should be noted that the image processing apparatus shown in the embodiments of this application may perform the technical solutions shown in the foregoing method embodiments. Implementation principles and beneficial effects of the image processing apparatus are similar to those of the technical solutions, and details are not described herein again.

Optionally, the foregoing processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. Steps of the authentication method embodiments disclosed with reference to this application may be directly implemented by a hardware processor, or may be implemented by a combination of hardware and a software module in a processor.

This application provides a computer-readable storage medium, where the computer-readable storage medium is configured to store a computer program, and the computer program is used to implement the image processing method according to the foregoing embodiments.

This application further provides a chip or an integrated circuit, including a memory and a processor.

The memory is configured to store program instructions, and is sometimes configured to store intermediate data.

The processor is configured to invoke the program instructions stored in the memory, to implement the foregoing image processing method.

Optionally, the memory may be independent, or may be integrated with the processor. In some implementations, the memory may alternatively be located outside the chip or the integrated circuit.

An embodiment of this application further provides a program product, where the program product includes a computer program, the computer program is stored in a storage medium, and the computer program is used to implement the foregoing image processing method.

All or some of the steps in the method embodiments may be implemented by hardware related to program instructions. The foregoing program may be stored in a computer-readable memory. When the program is executed, the steps of the methods in the embodiments are performed. The memory (storage medium) includes a read-only memory (ROM), a random-access memory (RAM), a flash memory, a hard disk, a solid state drive, a magnetic tape, a floppy disk, an optical disc, and any combination thereof.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

In this application, the term "including" and a variant thereof may refer to non-limitative inclusion, and the term "or" and a variant thereof may refer to "and/or". In this application, the terms "first", "second", and the like are intended to distinguish between similar objects but do not necessarily indicate a specific order or sequence. "A plurality of" in this application refers to two or more than two. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

What is claimed is:

1. An image processing method comprising:
obtaining a first image comprising first pixels;
obtaining a texture image of the first image, wherein the texture image comprises second pixels;
obtaining, in the texture image, a plurality of local texture images and respective weight values of the plurality of local texture images based on texture features of the second pixels, wherein textures in the plurality of local texture images have a same texture feature;
obtaining, based on the plurality of local texture images and the respective weight values, an image filter corresponding to the first image, wherein the image filter comprises respective filter parameters corresponding to each pixel of the first pixels, and wherein respective pixels of the first pixels that correspond to different texture features correspond to different filter parameters of the respective filter parameters; and
performing, based on the image filter, super-resolution processing on the first image to obtain a super-resolution image of the first image.

2. The image processing method of claim 1, further comprising:
obtaining, in the texture image, C local texture images and respective weight values of the C local texture images based on texture features of the second pixels, wherein textures in the C local texture images have a same texture feature, wherein $C=f^2 \times t$, wherein f is a preset amplification multiple, wherein t is a quantity of the respective filter parameters, wherein f is greater than 1, and wherein t is an integer greater than or equal to 1; and
a quantity of channels of the image filter is equal to C.

3. The image processing method of claim 2, wherein an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image, wherein i is a positive integer less than or equal to C, wherein x is a positive integer less than or equal to M, wherein y is a positive integer less than or equal to N, wherein M is a quantity of pixels horizontally comprised in the first image, wherein N is a quantity of pixels vertically comprised in the first image, and wherein M and N are integers greater than 1.

4. The image processing method of claim 2, further comprising:
performing, based on a preset size, a compression processing on the first image to obtain a compressed first image of the preset size; and
obtaining the texture image based on the compressed first image.

5. The image processing method of claim 1, wherein obtaining the image filter further comprises:
obtaining a recognition model by training a plurality of groups of samples, wherein each group of the groups of samples comprises a first sample image and a second sample image, wherein the first sample image and the second sample image have a same image content, and wherein a first resolution of the first sample image is higher than a second resolution of the second sample image; and
processing, using the recognition model, the first image to obtain the image filter.

6. The image processing method of claim 5, further comprising:
performing, based on a preset size, compression processing on the first image to obtain a compressed first image of the preset size; and
processing the compressed first image using the recognition model.

7. The image processing method of claim 1, further comprising:
obtaining a gradient image of the first image, wherein a size of the gradient image is the same as a size of the first image, wherein the size of the gradient image is M*N, and wherein M and N are both integers greater than 1;
processing, using the image filter, the gradient image to obtain a second image, wherein a size of the second image is (f*M)*(f*N), and wherein f is a preset amplification multiple;
amplifying the first image by f times to obtain a third image, wherein a size of the third image is (f*M)*(f*N); and
obtaining, based on the second image and the third image, the super-resolution image, wherein a size of the super-resolution image is (f*M)*(f*N).

8. The image processing method of claim 7, further comprising:
further processing, using the image filter, the gradient image to obtain $f^2$ sub-images, wherein a size of each of the $f^2$ sub-images is (f*M)*(f*N); and
obtaining the second image based on the $f^2$ sub-images.

9. The image processing method of claim 8, further comprising further processing, using parameters in a $(k*t+1)^{th}$ channel to a $(k+1)*t^{th}$ channel in the image filter, the gradient image to obtain a $k^{th}$ sub-image, wherein k is sequentially set to 0, 1, . . . , and $f^2-1$.

10. The image processing method of claim 8, further comprising:
separately performing splicing processing on pixels that are at a same pixel position in the $f^2$ sub-images to obtain M*N image blocks, wherein a size of each of the M*N image block is f*f; and
performing splice processing on the M*N image blocks based on pixel locations of pixels that are in each of the M*N image blocks in each of the $f^2$ sub-images to obtain the second image.

11. A computer system comprising:
a memory configured to store a computer program; and
one or more processors coupled to the memory, wherein when executed by the one or more processors, the computer program causes the computer system to:
obtain a first image that comprises first pixels;
obtain a texture image of the first image, wherein the texture image comprises second pixels;
obtain, in the texture image, a plurality of local texture images and respective weight values of the plurality of local texture images based on texture features of the second pixels, wherein textures in the plurality of local texture images have a same texture feature;
obtain, based on the plurality of local texture images and the respective weight values, an image filter, wherein the image filter comprises respective filter parameters corresponding to each pixel of the first pixels, and wherein respective pixels of the first pixels that correspond to different texture features correspond to different filter parameters of the respective filter parameters; and perform, based on the image filter, super-resolution processing on the first image to obtain a super-resolution image of the first image.

12. The computer system of claim 11, wherein when executed by the processor, the computer program further causes the computer system to:

obtain, in the texture image, C local texture images and respective weight values of the C local texture images based on texture features of the second pixels, wherein textures in the C local texture images have a same texture feature, wherein $C=f^2 \times t$, wherein f is a preset amplification multiple, wherein t is a quantity of the respective filter parameter, wherein f is greater than 1, and wherein t is an integer greater than or equal to 1; and a quantity of channels of the image filter is equal to C.

13. The computer system of claim 12, wherein an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image, wherein i is a positive integer less than or equal to C, wherein x is a positive integer less than or equal to M, wherein y is a positive integer less than or equal to N, wherein M is a quantity of pixels horizontally comprised in the first image, wherein N is a quantity of pixels vertically comprised in the first image, and wherein M and N are integers greater than 1.

14. The computer system of claim 12, wherein when executed by the one or more processors, the computer program further causes the computer system to:

perform, based on a preset size, a compression processing on the first image to obtain a compressed first image of the preset size; and obtain, based on the compressed first image, the texture image.

15. The computer system of claim 11, wherein when executed by the one or more processors, the computer program further causes the computer system to:

obtain a recognition model by training a plurality of groups of samples, wherein each group of the groups of samples comprises a first sample image and a second sample image, wherein the first sample image and the second sample image have a same image content, and wherein a first resolution of the first sample image is higher than a second resolution of the second sample image; and process, using the recognition model, the first image to obtain the image filter.

16. A computer program product comprising computer-executable instructions that are stored on a non-transitory computer-readable storage medium and that, when executed by one or more processors, cause an apparatus to:

obtain a first image that comprises first pixels;

obtain a texture image of the first image, wherein the texture image comprises second pixels;

obtain, in the texture image, a plurality of local texture images and respective weight values of the plurality of local texture images based on texture features of the second pixels, wherein textures in the plurality of local texture images have a same texture feature;

obtain, based on the plurality of local texture images and the respective weight values, an image filter, wherein the image filter comprises respective filter parameters corresponding to each pixel of the first pixels, and wherein respective pixels of the first pixels that correspond to different texture features correspond to different filter parameters of the respective filter parameters; and perform, based on the image filter, super-resolution processing on the first image to obtain a super-resolution image of the first image.

17. The computer program product of claim 16, wherein when executed by the one or more processors, the computer-executable instructions further cause the apparatus to:

obtain, in the texture image, C local texture images and respective weight values of the C local texture images based on texture features of the second pixels, wherein textures in the C local texture images have a same texture feature, wherein $C=f^2 \times t$, wherein f is a preset amplification multiple, wherein t is a quantity of the respective filter parameter, wherein f is greater than 1, and wherein t is an integer greater than or equal to 1; and a quantity of channels of the image filter is equal to C.

18. The computer program product of claim 17, wherein an $(x, y)^{th}$ filter parameter in an $i^{th}$ channel of the image filter is a product of a pixel value of an $(x, y)^{th}$ pixel in an $i^{th}$ local texture image and a weight value of the $i^{th}$ local texture image, wherein i is a positive integer less than or equal to C, wherein x is a positive integer less than or equal to M, wherein y is a positive integer less than or equal to N, wherein M is a quantity of pixels horizontally comprised in the first image, wherein N is a quantity of pixels vertically comprised in the first image, and wherein M and N are integers greater than 1.

19. The computer program product of claim 17, wherein when executed by the one or more processors, the computer-executable instructions further cause the apparatus to:

perform, based on a preset size, compression processing on the first image to obtain a compressed first image of the preset size; and obtain the texture image based on the compressed first image.

20. The computer program product of claim 16, wherein when executed by the one or more processors, the computer-executable instructions further cause the apparatus to:

obtain a recognition model by training a plurality of groups of samples, wherein each group of the groups of samples comprises a first sample image and a second sample image, wherein the first sample image and the second sample image have a same image content, and wherein a first resolution of the first sample image is higher than a second resolution of the second sample image; and process, using the recognition model, the first image to obtain the image filter.

* * * * *